Figure 1:
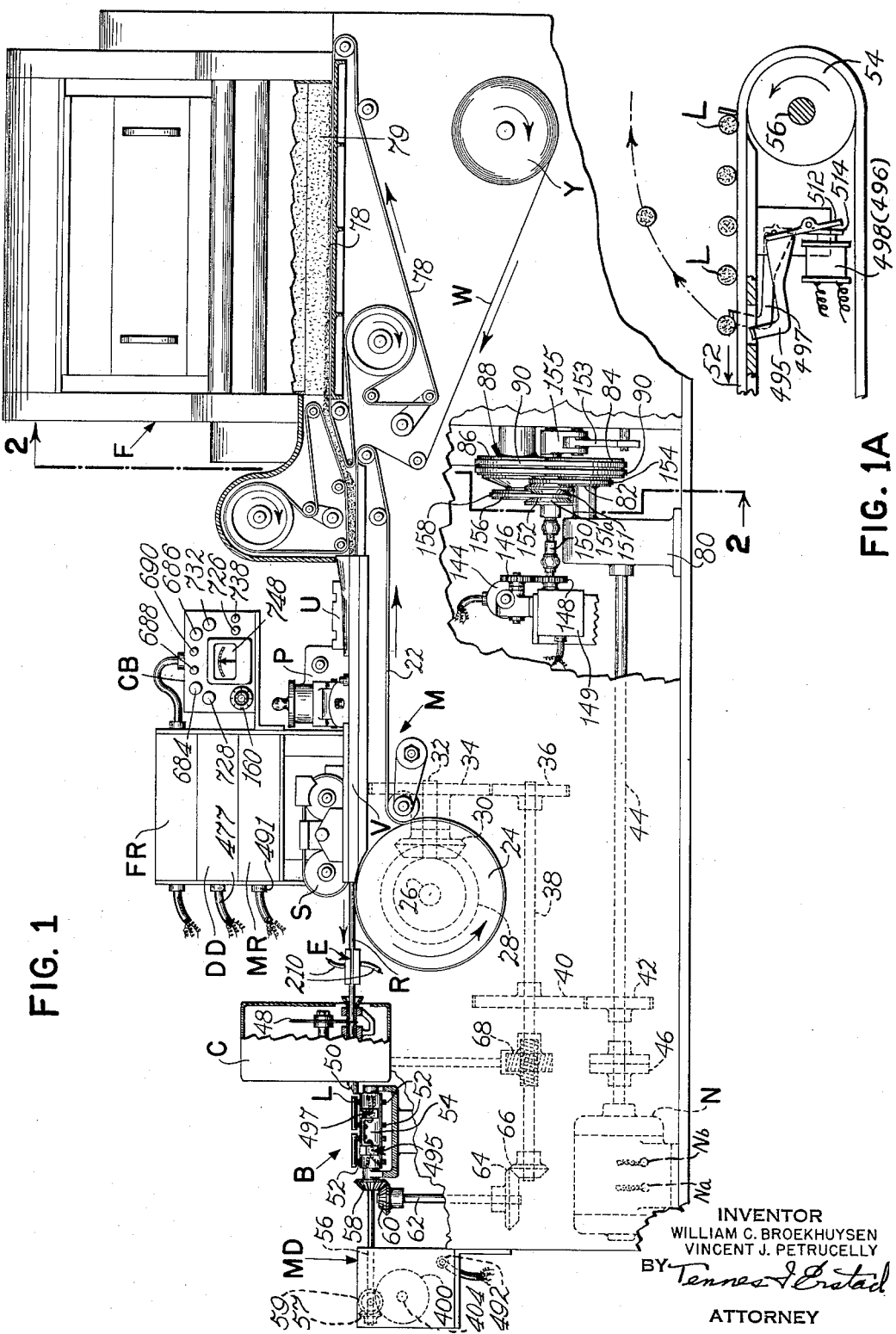

Jan. 3, 1956  W. C. BROEKHUYSEN ET AL  2,729,214
DETECTING AND CONTROL APPARATUS
Filed March 9, 1950  9 Sheets-Sheet 2

INVENTOR
WILLIAM C. BROEKHUYSEN
VINCENT J. PETRUCELLY
BY
ATTORNEY

Jan. 3, 1956     W. C. BROEKHUYSEN ET AL     2,729,214
DETECTING AND CONTROL APPARATUS
Filed March 9, 1950     9 Sheets-Sheet 3
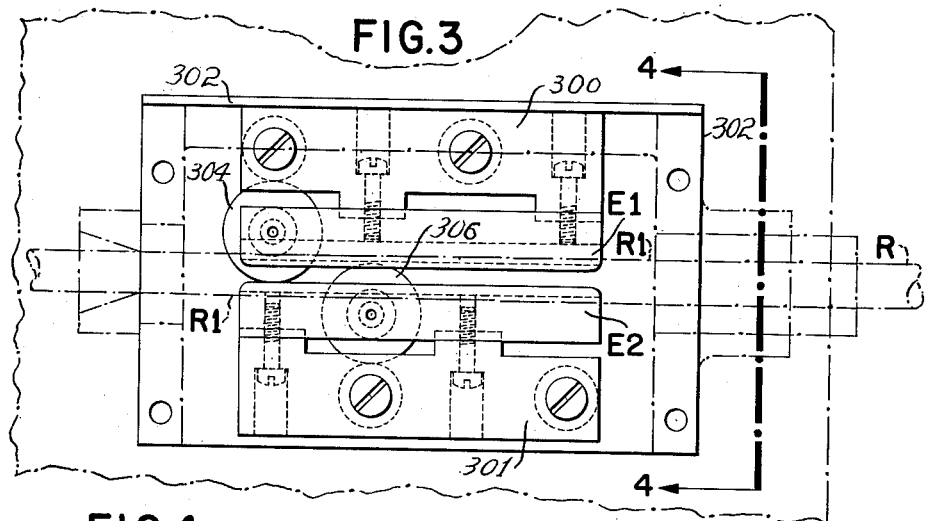
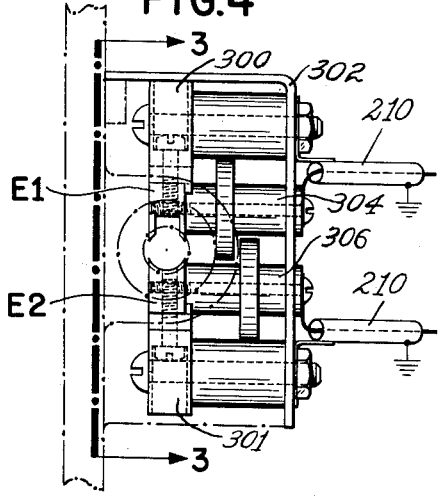
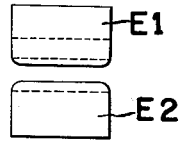
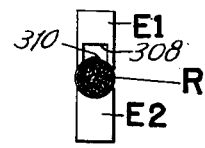
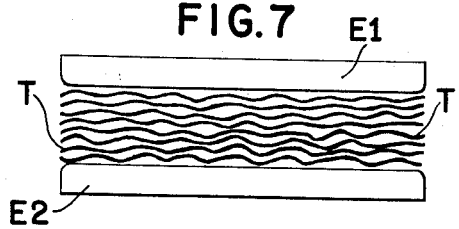
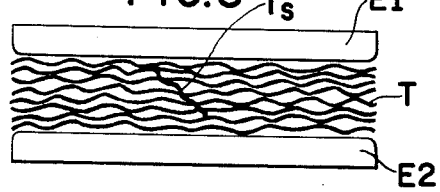
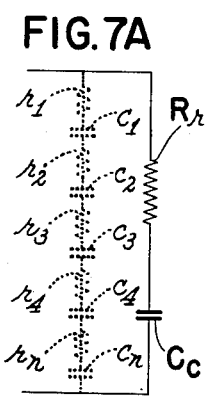
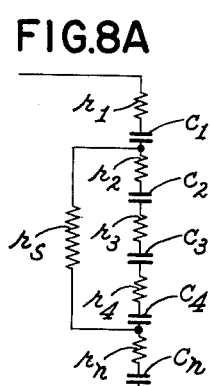
INVENTOR
WILLIAM C. BROEKHUYSEN
VINCENT J. PETRUCELLY
BY
ATTORNEY

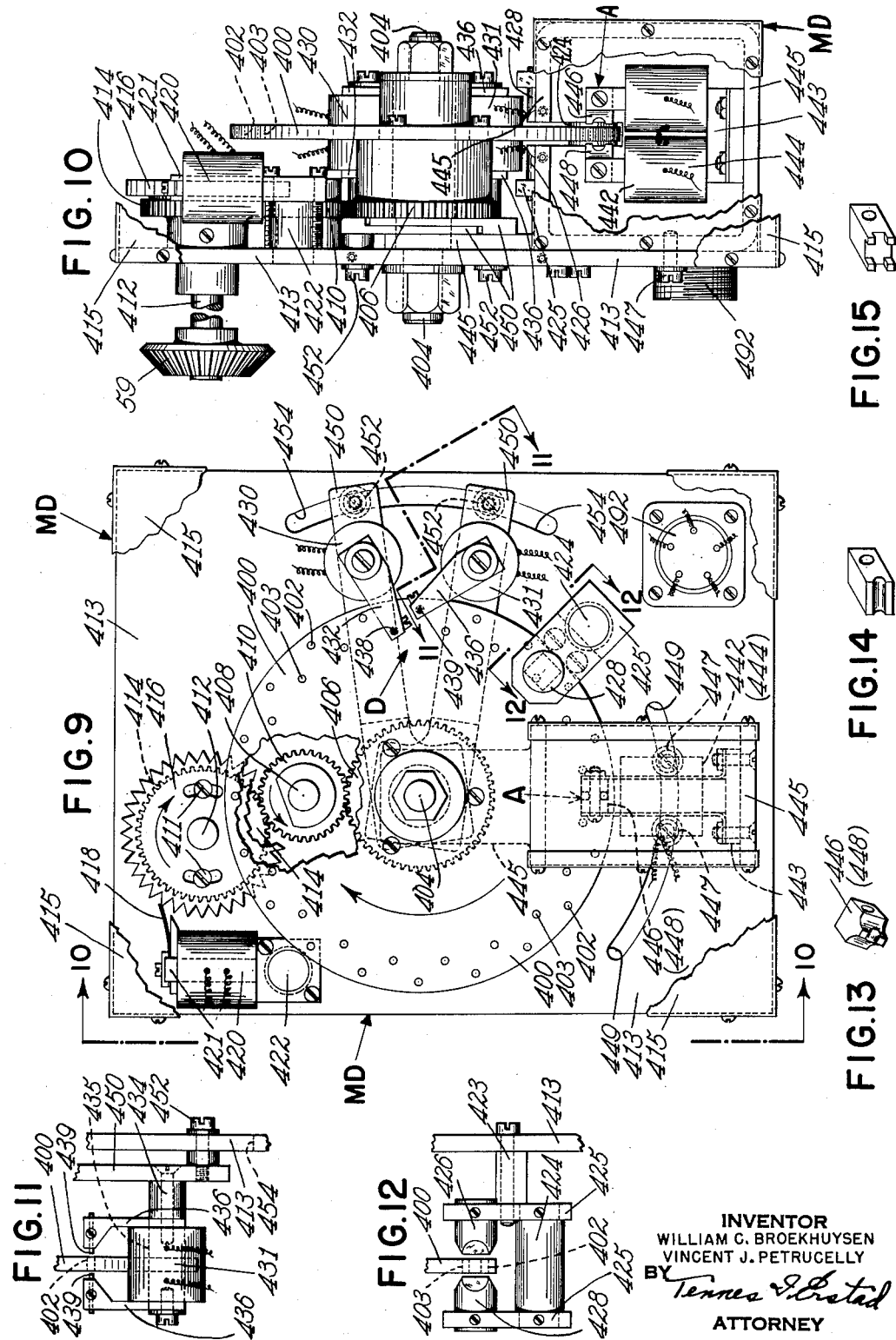

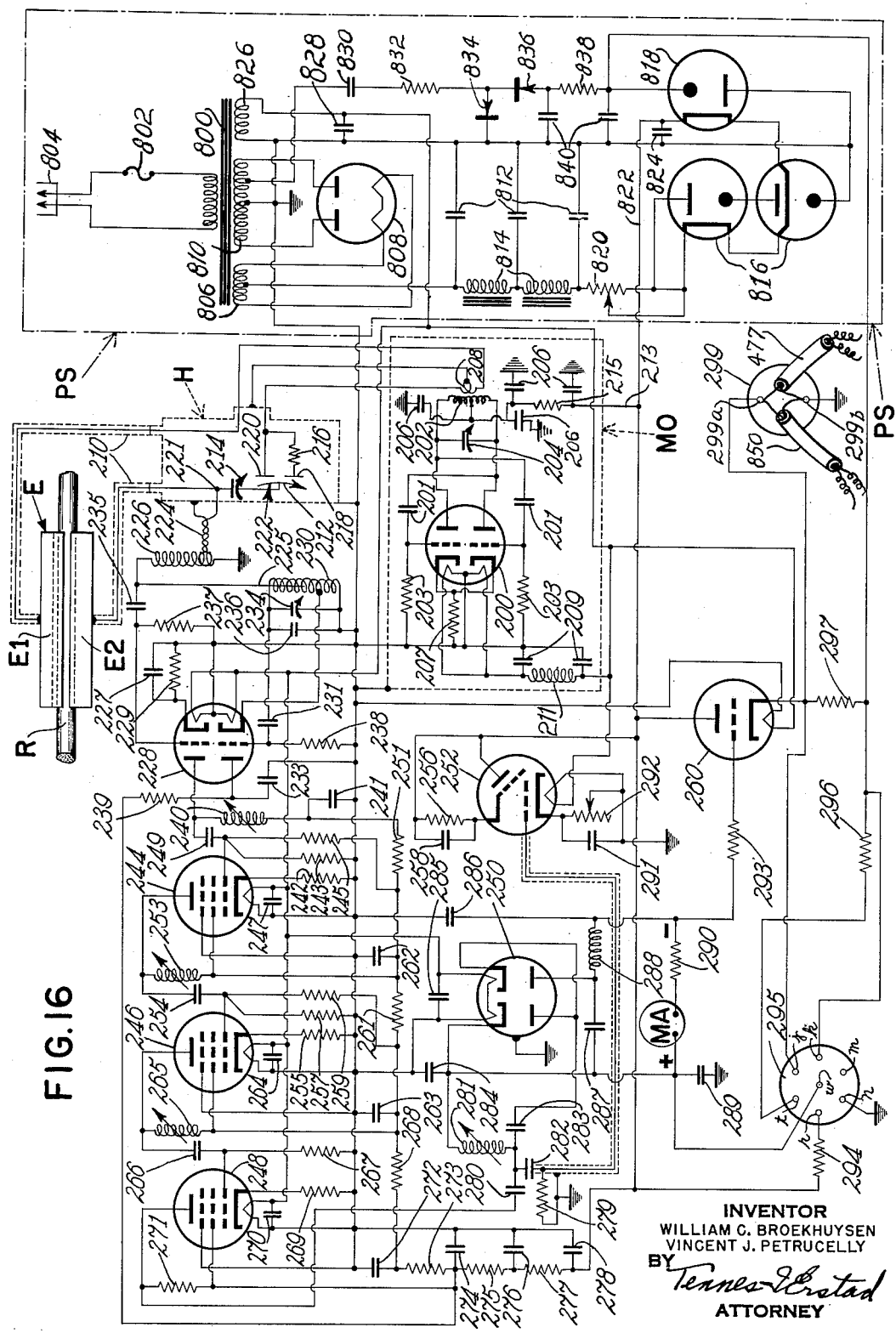

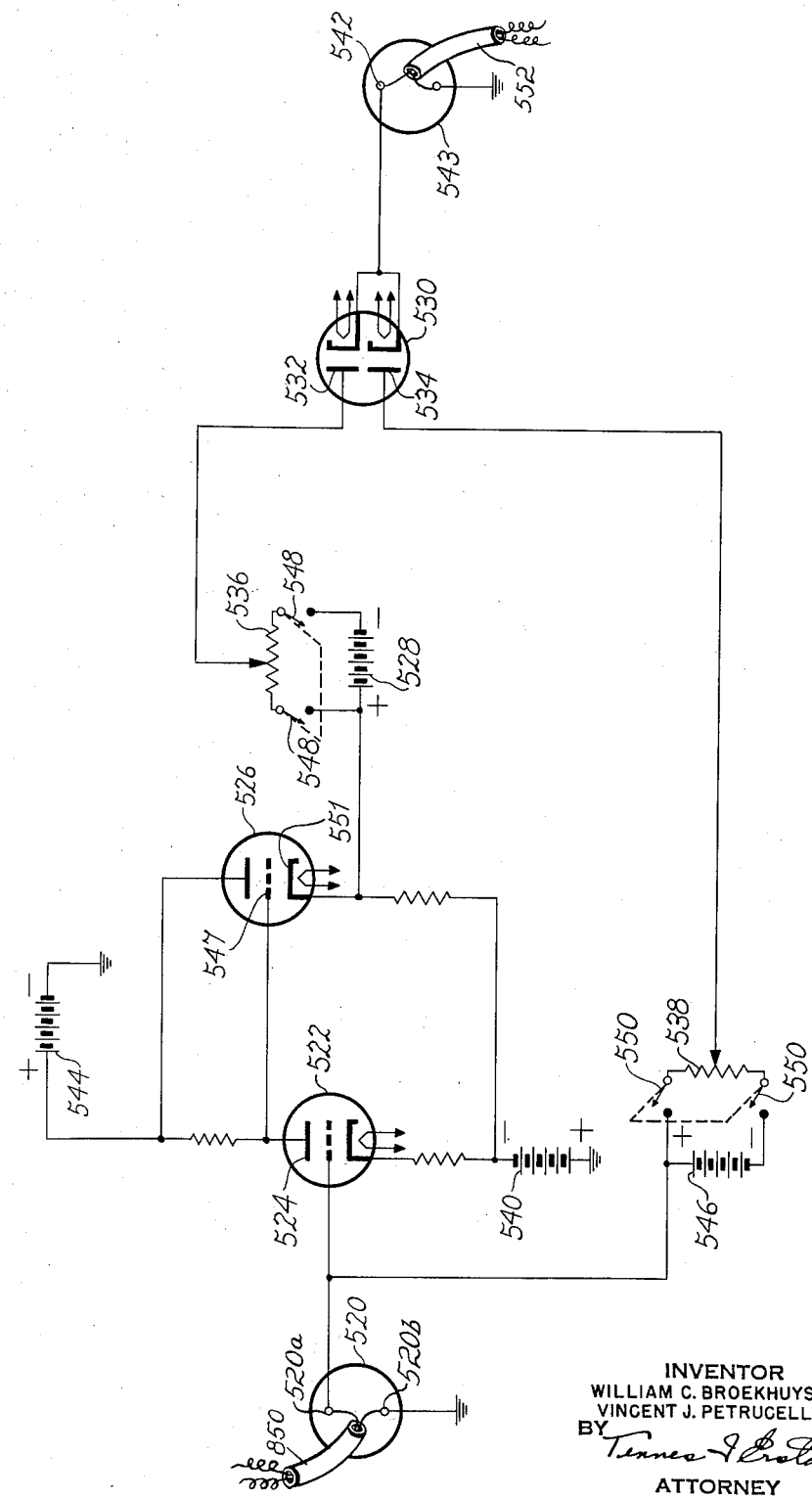

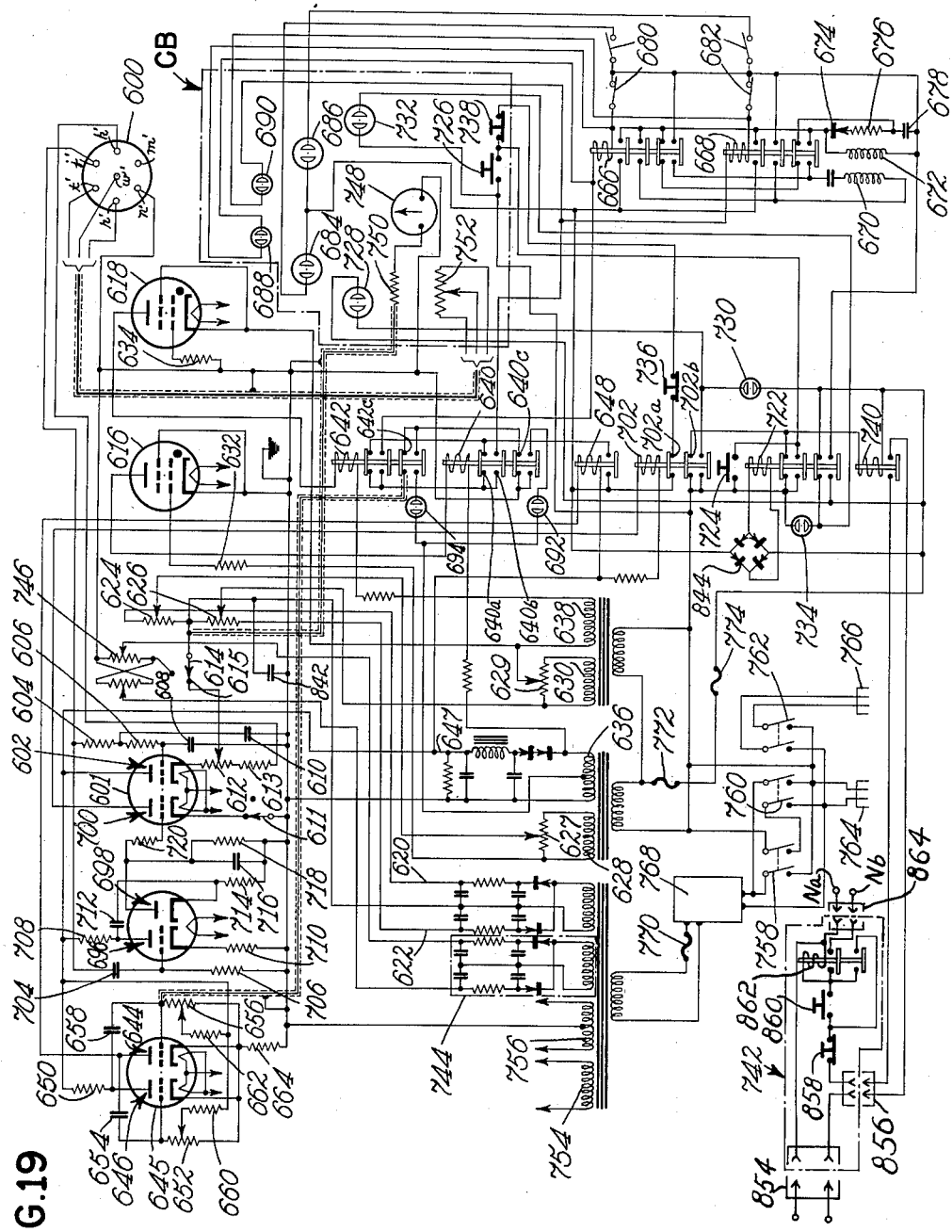

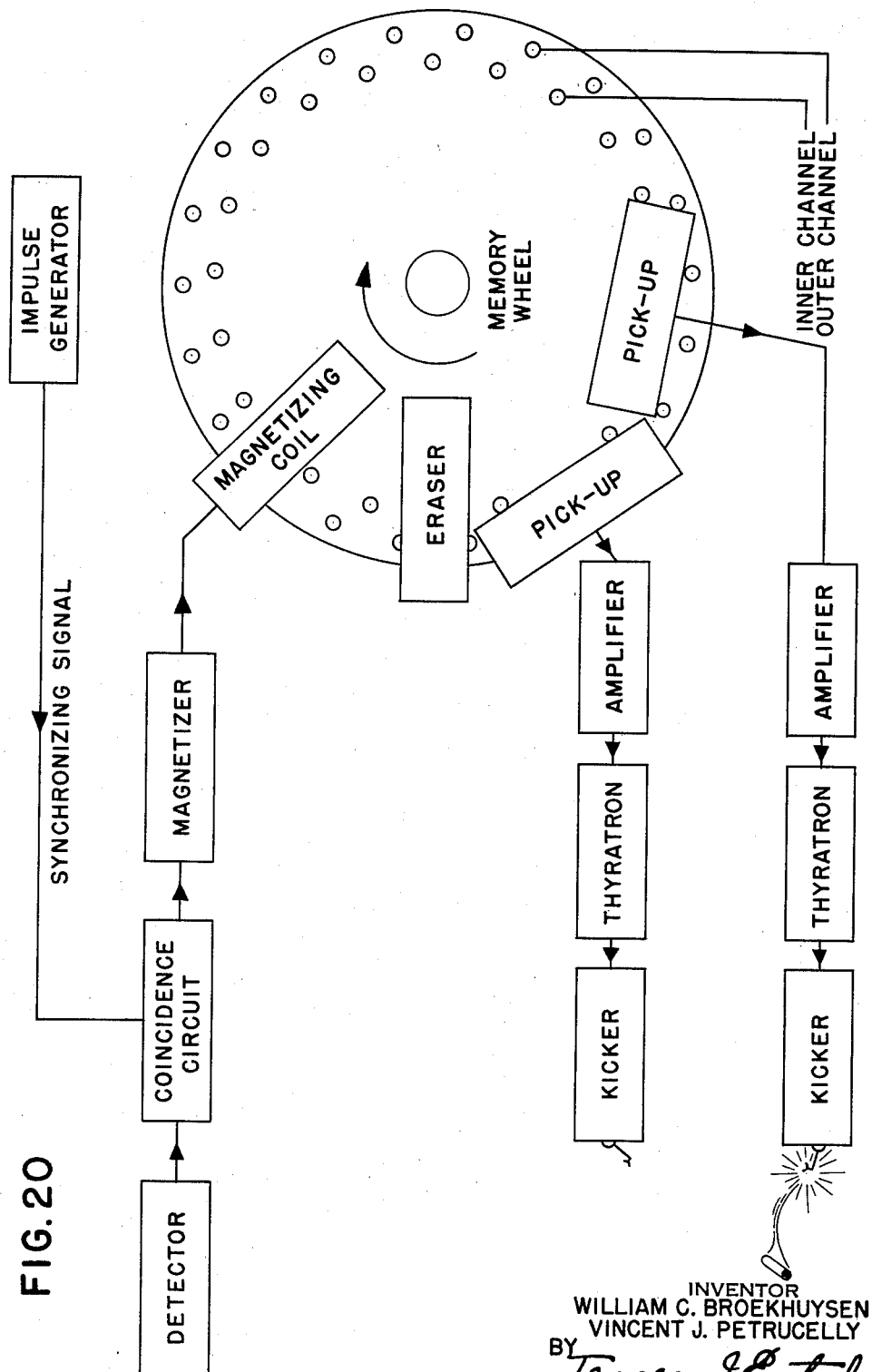

United States Patent Office 2,729,214
Patented Jan. 3, 1956

2,729,214

DETECTING AND CONTROL APPARATUS

William C. Broekhuysen, Brooklyn, and Vincent J. Petrucelly, New York, N. Y., assignors to American Machine & Foundry Company, a corporation of New Jersey Application March 9, 1950, Serial No. 148,662

22 Claims. (Cl. 131—21)

This invention relates to detecting apparatus for detecting the quantity, composition and moisture content of materials, particularly where the material is not homogeneous in composition, is irregular in texture, and the quantity being measured is small. For example, this invention is particularly well suited for use with cigarette making machines for detecting the condition of the cigarette rod thereof and for correcting the operation of the cigarette making machine so as to obtain cigarettes having fillers of a high degree of uniformity.

Heretofore various attempts have been made to detect the condition of cigarettes as they are being manufactured by a cigarette making machine. Some have utilized mechanical feelers while others have used electrical means for detecting hollow spots, plugs and non-uniform cigarettes and then either rejected the defective cigarette and/or adjusted the feed so as to obtain a uniform feed of tobacco to the cigarette rod. These prior efforts have all had disadvantages which made it impractical for them to be put into commercial practise. One of the principal objections to the previous approaches has been the fact that they fail to measure with a sufficiently high degree of accuracy to be usable on a commercial machine for which they were designed. Continued effort to obtain a solution to this problem finally resulted in the present invention.

Without the use of the present invention the cigarettes a consumer purchases today vary in individual weight from 20 to 32 cigarettes per ounce even though every effort is made to adjust cigarette making machines so as to reduce the variation as much as possible. The reason cigarettes have such a relatively wide variation in tobacco content is due sometimes to the length of the shreds being processed and at other times to uneven blending and conditioning of tobacco. Manufacturers of course make every effort to minimize the effect of these variables since it is obviously to everyone's advantage to have the tobacco content in cigarettes exactly uniform but even with these efforts the weight variation still persists.

In view of the foregoing factors some of the objects of this invention may be briefly stated to be as follows.

One of the principal objects of this invention is to provide a detecting apparatus for detecting the quantity, composition and moisture content of materials, especially where the material is not homogeneous in composition, is irregular in texture and the quantity undergoing measurement is relatively small. Such types of material, for example, are used in various fields of endeavor such as in the manufacture and processing of wool yarn, textiles, paper and in the processing and manufacture of tobacco products such as cigarettes.

Another object of the present invention is to provide a detector which can be used to accurately detect any defective cigarettes made by a machine making cigarettes at the rate of 1200 or more cigarettes per minute (as well as at a lesser rate) and which does not fail to consistently operate correctly when hollows or plugs are found in cigarettes being manufactured at this rate.

Another object of this invention which is ancillary to that just stated is to provide a detector which will not register a defective cigarette when actually in fact the cigarette is of normal uniformity. By using such a detector with the other apparatus disclosed herein, it is possible to narrow the variation in weight of the cigarettes found in the ultimate cigarette package.

Another object is to provide a dielectric detector using a high frequency (between 50 and 200 megacycles) which is less likely to be affected by the arrangement of the particles making up the material to be detected.

A further object of the invention is to provide a detector which is capable of detecting hollow and dense portions of a cigarette anywhere along the length of a cigarette and which is also capable of detecting variations in average density between cigarettes.

Another object is to provide for those cases where it is desirable to only reject cigarettes having either hollow ends or dense ends and to disregard hollows or plugs in the center portion of the cigarette to suit the demands of a particular market where the cigarettes are to be sold.

It is also an object to provide an enclosure for the dielectric electrodes which will minimize and prevent interference from outside sources with the detection being made on the article being inspected.

Another object of this invention is to mount the dielectric detectors so as to minimize the effect that the pasted seam has on the dielectric field.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 2:
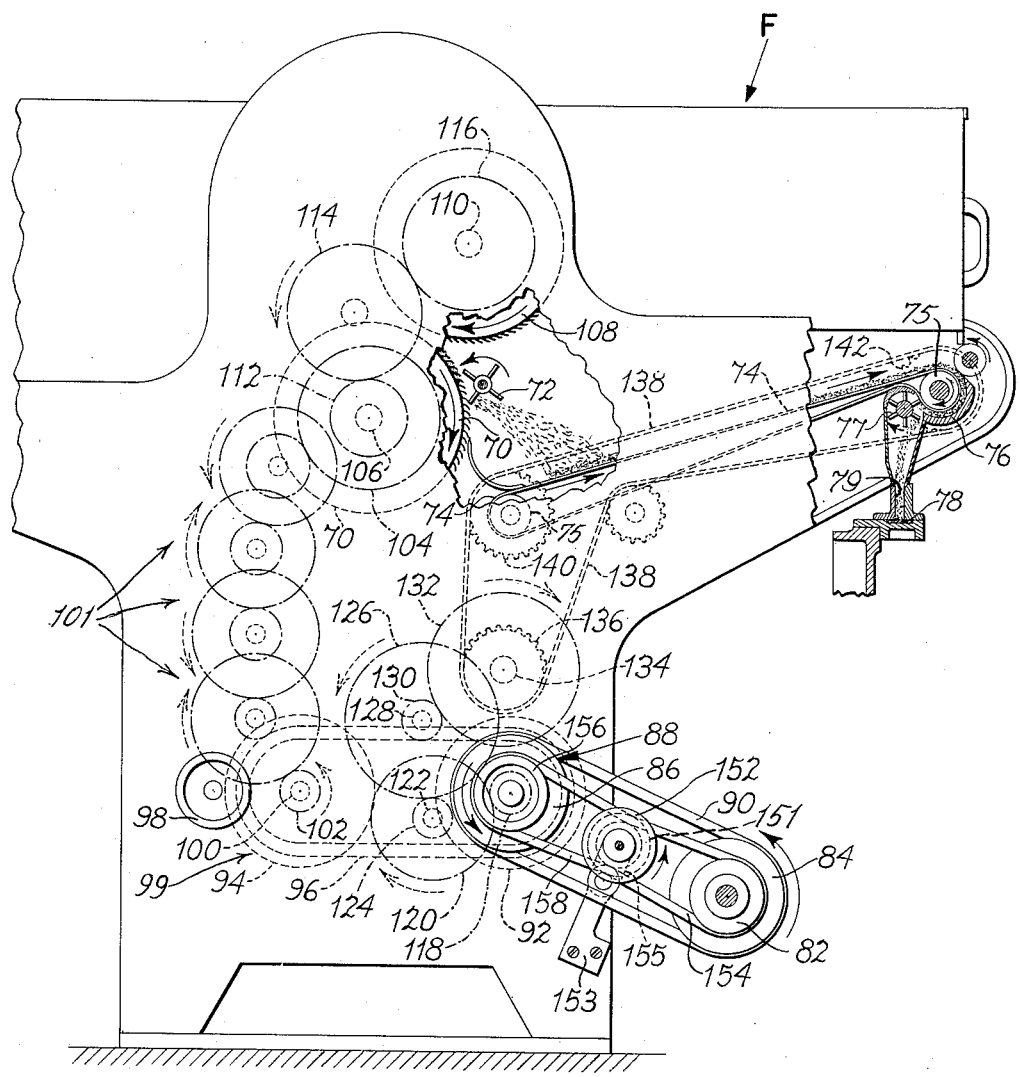
Figure 2A:
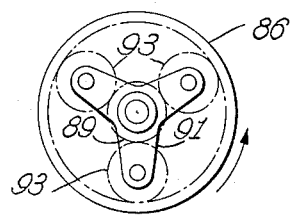
Figure 17:
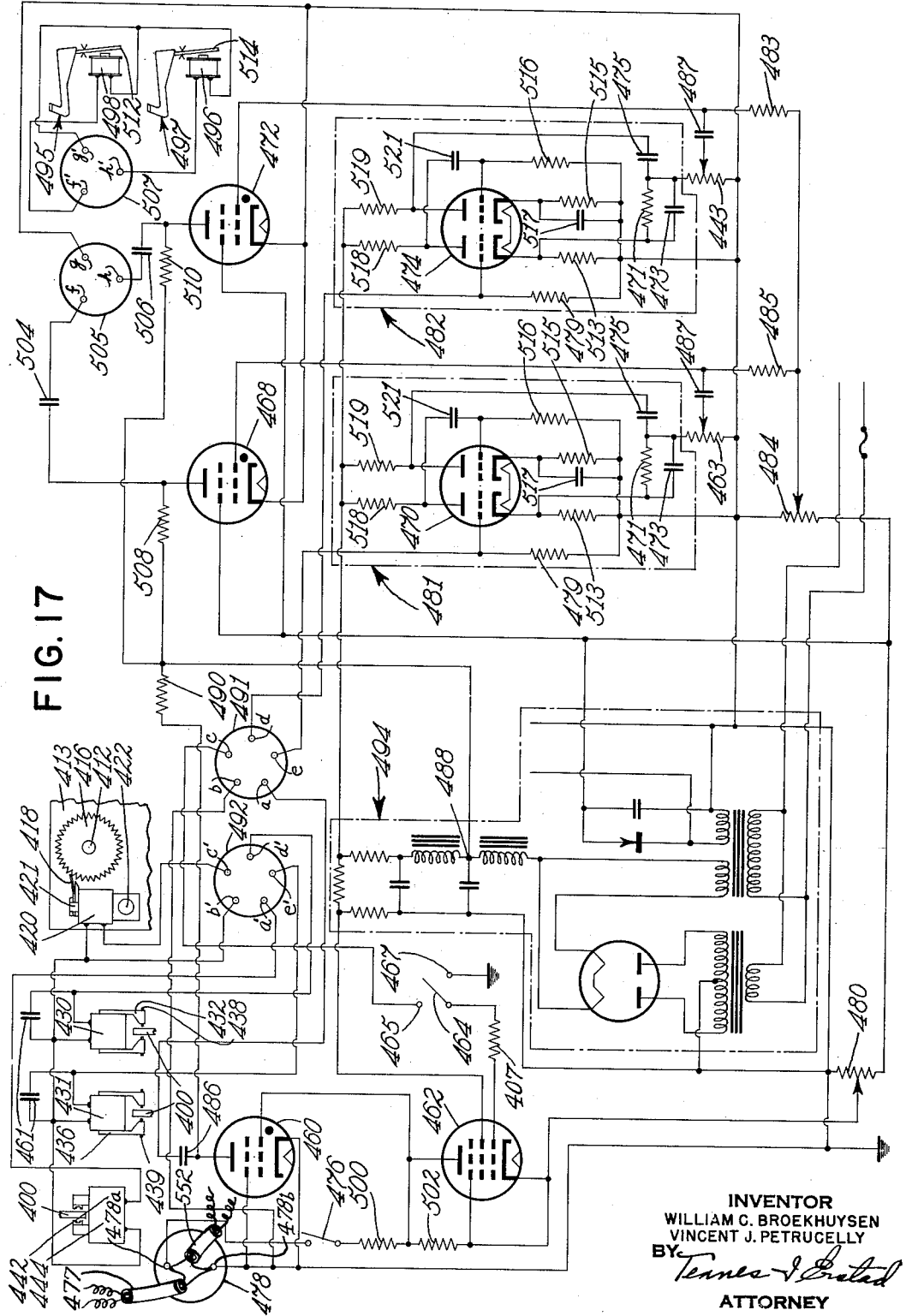

Fig. 1 is a front elevation, with part broken away, of a continuous rod cigarette machine in conjunction with the dielectric cigarette detecting, correcting and ejecting apparatus, Fig. 1A is a view of the "kick-out" device, Fig. 2 is a side elevation of the tobacco feed of the continuous rod cigarette machine as seen from line 2—2 of Figure 1, illustrating the drive of the principal mechanism of the same, Fig. 2A is a schematic view illustrating the driving mechanism inside of the differential pulley, Fig. 3 is a rear elevation of the electrode assembly, Fig. 4 is an end elevation of the same, taken on line 4—4 of Figure 3, Fig. 5 is a side elevation of a pair of short electrodes for detecting short underfilled portions (voids or holes) or overfilled portions (plugs) in the cigarette rod, Fig. 6 is an end elevation of said short electrodes, Fig. 7 is a diagrammatic representation of parallel layers of tobacco strands between the electrodes, Fig. 7A shows the equivalent electrical circuit for the same, Fig. 8 is a diagrammatic representation of parallel layers of tobacco strands partially bridged by a tobacco strand crossing several layers, Fig. 8A shows the equivalent electrical circuit for the same, Fig. 9 is a front elevation of the magnetic memory and timing apparatus, Fig. 10 is an end elevation of the same, taken on line 10—10 of Fig. 9, Fig. 11 is an end elevation of the pick up device as seen from line 11—11 of Fig. 9 of the magnetic memory apparatus, Fig. 12 is an end elevation of the deenergizer, as seen from line 12—12 of Fig. 9 of the magnetic memory apparatus, Fig. 13 is an isometric view of a recorder magnet pole piece used when recording total weight of cigarettes, Fig. 14 is an isometric view of a recorder magnet pole piece used when detecting holes anywhere in the cigarette rod, Fig. 15 is an isometric view of a recorder magnet pole piece used when recording holes in the ends of cigarettes, Fig. 16 is a diagram of a 100 megacycle dielectric detector circuit, Fig. 17 is a diagram of the memory and rejector circuit, Fig. 18 shows a modification of the diagram in Fig. 17 for rejecting heavy as well as light cigarettes, or for holes as well as plugs, Fig. 19 is a diagram of the feed regulator control circuits, and Fig. 20 is a block diagram of the memory and rejecting apparatus.

For purposes of illustrating our invention we have shown in Fig. 1 a conventional continuous rod cigarette making machine which consists of a tobacco feed designated generally by the symbol F and a cigarette maker designated generally by the symbol M. The principal components of cigarette maker M, consist of a rod folder tongue U, rod former V, a cigarette rod paster P, a rod sealer S, a cut off device C, and a cigarette catcher or collector B. The manner in which these components of a cigarette making machine function may be briefly described as follows:

The tobacco feed F showers tobacco continuously onto a traveling tape 78 which delivers the showered tobacco to the traveling paper web W. The paper web W is fed from a reel Y and is guided through the rod folder tongue U, the rod paster P, which applies a strip of paste to the lap edge of the cigarette rod, the rod former V and the rod sealer S, by a continuously moving folding belt 22 driven by the drum 24. Drum 24 is secured to a shaft 26, having a bevel gear 28 driven by a gear 30 secured to the shaft 32. A second gear 34 is also fixedly mounted on the shaft 32 and is driven by a gear 36 secured to a shaft 38 on which is mounted a gear 40 driven by a gear 42. The gear 42 is secured to the shaft 44 and is driven by a motor N through coupling 46. As will later be seen, the motor N provides the drive for the entire cigarette making machine.

When the cigarette rod R emerges from the rod former V, it passes through the cigarette cut off C wherein a knife 48 driven, in proper time relation with the movement of the cigarette rod, from the shaft 38 through a pair of spiral gears 68 and a gear train (not shown) cuts off individual cigarettes L of a predetermined length from the cigarette rod.

These cigarettes pass through a guide 50 and each cigarette is delivered alternately to a pair of catcher belts 52 which deliver them to a suitable collecting receptacle. Belts 52 are driven in proper timed relation with the speed of the cigarette making machine by a roller 54 secured to a shaft 56 on which is mounted a bevel gear 58. The gear 58 is driven by a gear 60 secured to a shaft 62 on which is mounted a bevel gear 64 driven by a gear 66 secured to shaft 38.

As will be seen in Fig. 2, the feed F is of the general type wherein a customary carded feed drum 70 picks up tobacco from a supply hopper and conveys it to a position where it is removed by a picker roller 72 and deposited in the form of a layer upon a wide feed belt 74. The belt then conveys it forward into a concave 76 where it is formed into a mat of uniform density. The tobacco from this mat is then removed by the concave picker roller 77 and falls into a guide channel 79 and is deposited in a uniform ribbonlike layer upon a continuously moving belt 78 which conveys the tobacco to the paper web as seen in Fig. 1.

The tobacco feed F is driven from the shaft 44 (Fig. 1) which through a gear reduction drive 80, drives a pulley 82 which is integral with a double pulley 84. Double pulley 84 drives a double pulley 86 through belts 90. The double pulley 86 comprises part of a differential pulley 88 having a sun gear 89 and a spider 91 carrying planetary gears 93 which mesh with the sun gear 89, as shown schematically in Fig. 2A. While the drive just mentioned is not being claimed in this patent application, it is disclosed and claimed in a copending application filed March 9, 1950, in the name of Broekhuysen and Gilman, S. N. 148,661.

A conical pulley 92 of a conventional variable speed drive or Reeves drive 99 such as described in U. S. patent to J. A. Stein, 1,810,932, granted June 23, 1931, is mounted on the output shaft of the differential pulley 88. The other coacting pulley 94 of the variable speed drive is driven by means of belt 96 which connects it to the pulley 92. The speed ratio of the variable speed drive may be changed by means of the hand wheel 98 extending through the frame of the tobacco feed F in the manner fully described in the above mentioned patent granted to J. A. Stein. Pulley 94 and gear 102 are both fixedly mounted on the shaft 100. Gear 102, through a conventional gear train 101 such as shown in Fig. 2, drives a gear 104 secured to a shaft 106 on which is mounted a tobacco feed drum 70. In this conventional type of feed, a carded refuser drum 108 mounted on shaft 110, coacts with the feed drum 70 to limit the amount of tobacco picked up by the feed drum, and is driven by a gear 112, secured to shaft 106, through an idler gear 114 which in turn drives a gear 116 secured to shaft 110.

The output shaft of the differential pulley 88 also has a gear 118 mounted thereon which drives a gear 120 secured to a shaft 122 carrying a second gear 124. Gear 124 drives a gear 126 secured to a shaft 128 on which is mounted a gear 130 driving gear 132 secured to a shaft 134. A sprocket 136 fixedly mounted on shaft 134 drives a chain 138 which in turn drives sprockets 140 and 142. Secured to the shafts upon which these sprockets 140 and 142 are mounted, are rollers 75 which drive the feed belt 74.

The output speed of the differential pulley 88 is varied by means of a variable speed transmission such as that shown in U. S. Patent 2,253,921, granted to Victor H. Van Sant on August 28, 1941, to which reference may be made for a detailed description and illustration of the same. The principal features of this unit may be briefly described as follows:

The transmission unit receives driving power from the pulley 82 and transmits this power to the driven pulley 156 through a double variable ratio pulley 152 having cone-faced belt-engaging discs 151. The double pulley 152 is of such construction that the center belt engaging disc 151 is movable toward either of the outer cone-faced walls 151a so as to vary the effective diameter of each of the pulleys making up the double pulley 152. In other words, the effect of moving the center belt engaging disc of the double pulley 152 is to increase the diameter of one pulley and decrease the diameter of the other pulley comprising the double pulley 152. In this way the speed ratio between pulley 82 and pulley 156 may be varied. Power is transmitted by means of the belt 154 between pulley 82 and one side of the double pulley 152. Power so received is transmitted by means of belt 158 from the other side of the double pulley 152 to the pulley 156 to which the sun gear 89 is connected.

The double pulley 152 is pivotally mounted on a floating link 155 pivotally connected to bracket 153 to allow for changes in the outstretched lengths of the belt 152 and 158 due to changes made in the speed ratio. The hub of center disc of double pulley 152 is so mounted on a shaft that when the flexible coupling 150 is turned it will move the center disc longitudinally along its axis of rotation.

As previously mentioned the differential pulley 88 is of conventional design employing a sun gear 89 and planetary gears 93 which revolve around the sun gear 89 (Fig. 2A). When the internal teeth of the double pulley 86 and the teeth of the sun gear 89 engage with the planetary gears 93, the speed of rotation of the pulley 156 and the double pulley 86 are both reflected simultaneously in the speed with which the planetary gears 93 are compelled to revolve. As a consequence any change in the variable ratio double pulley 152 will be reflected immediately in some fixed proportion in the speed at which the planetary gears 93 revolve. The planetary gears 93 are connected by means of a conventional spider 91 to the output shaft of the differential pulley 88.

The speed ratio of the double pulley 152 is automatically changed by means of a reversible gear reduction adjusting motor 144 which through gears 146 and 148 rotates the flexible coupling 150 to make whatever adjustment is desired. Since the variable ratio double pulley 152 has a limited range limit switches operated by gear 148 are enclosed in the housing 149 so as to prevent the reversible gear reduction adjusting motor 144 from moving the variable ratio double pulley 152 beyond its range. If the feed F has to be adjusted to a greater degree than is obtainable within the range of the variable speed drive 152, the hand knob 98 of the Reeves drive 99 is turned to obtain a greater change in the speed of the feed drum 70 and the components coacting therewith.

It will thus be seen that the variable ratio pulley 152 is automatically adjusted within a limited range due to impulses received from the detecting apparatus hereinafter described so as to increase or decrease the speed of the output shaft of the differential pulley 88. By means of the connections previously described the speed of the output shaft is immediately reflected in the change in the speed of feed drum 70 and also in the speed of the feed belt 74.

*Dielectric detector*

The fundamental method of measuring quantities or moisture content of a material by placing it between the plates of a condenser and measuring the capacity and loss of this condenser is fully discussed in U. S. Patent 2,357,860, granted to U. A. Whitaker on September 12, 1944. If the quantity of material between the plates is held constant this measurement can be used to determine the moisture content or other properties of the material. If the composition of the material, including its density, moisture content, is held constant, the measurement can be used to determine the quantity of material between the plates. It will therefore be understood that while the following description is directed to the case where both the composition of the materials, and the moisture content thereof are held constant, these observations are equally applicable to the former case where the quantity of material is constant but the moisture content and other properties of the material fluctuate.

If the material is homogeneous, or if large quantities are involved so that local variations can be neglected, the dielectric method is relatively simple. On the other hand if the material is not homogeneous in composition, and is irregular in texture, and the quantity to be measured is small, various factors interfere with the obtainment of an accurate measurement and detection. This is particularly true when we try to measure the quantity of tobacco in the "rod" on a cigarette making machine. Similar problems would of course also be encountered in measuring for example such materials as wool yarn, textiles and paper.

The quantity of tobacco in the "rod" is measured by passing it between two electrodes E1 and E2 as shown in cross section in Figs. 3, 4, and 6. The electrodes E1 and E2 are mounted on insulators 300 and 301 which in turn are respectively mounted on metallic grounded enclosure 302. The high frequency connections are brought through insulators 304 and 306 respectively to electrodes E1 and E2. The length of the electrodes will depend on the application and may be short as shown in Fig. 5, or long, as shown in Fig. 3. These electrodes form one arm of a capacity bridge which will be described hereinafter in detail. This bridge circuit is energized from a source of high frequency alternating current.

The strands of tobacco in the cigarette rod are irregularly distributed in the space between the electrodes and the size of the tobacco particles varies from dust particles to strands which are longer than the distance between the electrodes. The tobacco has a certain dielectric constant and a dielectric loss, the latter depending on the frequency of the energizing current. In addition each strand of tobacco has a certain amount of conductance which permits flow of current if it is not located entirely in an equipotential zone. This factor is separate and distinct from the dielectric loss. All three factors vary with the moisture content.

Fig. 7 is a simplified schematic illustration of two parallel electrodes with layers of tobacco T between them which are substantially parallel to the surface of the electrodes and therefore constitute equipotential surfaces. Consequently there is no current flowing lengthwise through the tobacco strands T, as that only with their dielectric constant and loss need be considered. Electrically this may be represented by the diagram in Fig. 7A which shows a condenser $C_c$ in series with a resistor $R_r$. Each layer of tobacco strands T as a conducting plate forming a series of condensers $c_1$, $c_2$ to $c_n$ in series, each with a series resistance $r_1$, $r_2$, to $r_n$ as shown in dotted lines in Fig. 7A. In this case we have:

$$\frac{1}{c} \text{ equals } \frac{1}{c_1}+\frac{1}{c_2}+\frac{1}{c_3} \ldots +\frac{1}{c_n}$$

$$R_r \text{ equals } r_1+r_2+r_3 \ldots +r_n$$

If, however, one strand of Tobacco $T_s$ is located at an angle to the equipotential planes as shown in Fig. 8 it shunts several of the capacitances and produces the electrical equivalent shown in Fig. 8a where $r_2$, $c_2$, $r_3$, $c_3$, $r_4$, $c_4$ are shunted by the resistance $r_s$ of the crossing tobacco strand. If the resistance $r_s$ is of the same order of magnitude or smaller than the total impedance which is shunted by it, it will have a far greater effect on the overall impedance than it would if located in an equipotential plane.

What has just been said was not realized by the previous art and for this reason a high degree of correlation between the measured value of the total impedance of the condenser formed by the electrodes E and the rod R and the quantity and composition of the rod itself could not be obtained. Heretofore when dielectric detecting devices were used for detecting defects they did not adequately or accurately measure the condition of the material they were detecting.

Since it is extremely difficult to materially change the value of $r_s$, the overall impedance of $c_c$ is reduced by increasing the frequency of the source which energizes the electrodes. The effect of increased frequency on $r_s$ is an increase in resistance. Therefore, an increasingly closer correlation between the total impedance of the condenser formed by the electrodes and the rod, and the characteristics of the rod results with increasing frequency. At a frequency of ½ or 1 megacycle the correlation is decidedly poor. At 30 megacycles it is considerably improved. At 100 megacycles, with electrodes equal in length to one cigarette the accuracy was found in actual test to be plus or minus 1¼%. Most of this remaining error is probably in the measuring circuit, so it can be said that at this frequency the effects of irregular geometric distribution of the tobacco strands have been practically eliminated. The circuit disclosed in this application is capable of use with frequencies up to 200 megacycles and by actual test, some of these higher frequencies have been found to be very satisfactory.

It is of course impossible to give an absolute minimum frequency which will give accurate results. For feed control purposes, where the impedance is averaged over a considerable length of rod (5 to 25 ft.) by an integrating circuit in the output of the detector, a frequency of 30 megacycles may be satisfactory. For "weighing" individual cigarette lengths or for detecting short voids or plugs of less than cigarette length, a frequency of 50 to 200 megacycles may be required, depending on the uniformity of the tobacco and the accuracy desired.

The electrodes and their mounting are shown in Figs. 3 to 6. They are preferably mounted so that one electrode straddles the seam 310 in order to minimize the effects of the paste which is not quite dry when it passes the electrode so that the field passes through the thinnest part of the tape or cigarette wrapper. The electrode has a groove 308 to prevent accumulation of paste by avoiding contact with the paste area. Both electrodes are mounted on insulating structures designed to keep their capacity to ground at a minimum while maintaining the highest possible resistance to ground even when dust accumulates on the insulator surfaces.

Another important objective in the design of the electrodes as well as the circuit was that the detector should have the highest possible sensitivity for changes in capacity between the electrodes, but as little sensitivity as possible for changes in capacity between either electrode and ground. These portions $R_1$ of the rod R which are situated between the walls of the electrodes enclosure 302 and the ends of the electrodes should preferably have no effect on the output of the detector. Otherwise it becomes extremely difficult to determine the weight or more accurately, the density, of individual cigarette lengths or to detect and determine the location of short voids or plugs. Since the space available for the electrode assembly is limited in a cigarette making machine, it is not possible to make the distance from the ends of the electrodes to the walls of the enclosure so long that the variations in those sections of rod can be neglected, unless special circuit precautions are taken. Another method would be to use short shielding electrodes on both ends, connected to suitable points in the radio frequency circuit, but this too requires more spacing than is available in a cigarette making machine.

The detector circuit which provides a solution to the various problems mentioned is shown in Fig. 16. The electrodes E are shown in Fig. 16 with the rod R passing between them. High frequency power is derived from an oscillator tube 200 which may be double triode, connected in a conventional push-pull oscillator circuit, tuned to a frequency of 100 megacycles. The main oscillator MO in Fig. 16 is completely shielded to prevent interaction between it and other parts of the circuit. All components are rigidly fixed to increase stability. 202 is the tank coil and 204 the tank capacitor of the oscillator. Positive direct voltage is supplied to the center tap of coil 202. Condensers 206 are radio frequency bypass condensers.

Grid resistors 203 are connected to their respective grids of main oscillator tube 200. Capacitors 201 are connected between the grid of one section and the plate of the other section of the double triode. Cathode resistor 207 aids in providing equal division of current between the two halves of double triode 200. Condensers 209 and radio frequency choke 211 serve to eliminate radio frequency from the filament wiring. Coil 208 which has a grounded center tap is inductively coupled to coil 202. The two halves of coil 208 also constitute two adjacent arms of a bridge circuit. Electrodes E and coaxial cables 210 form the third arm.

The fourth arm consists of a balancing network containing differential condenser 212, variable condenser 214, and fixed resistor 216. Resistor 216 is connected in series with stator 218 of differential condenser 212, and the other end of this resistor 216 is connected to stator 220 of differential condenser 212 as well as to one side of coil 208.

When rotor 222 of condenser 212 is adjusted for more capacity to stator 220, the fourth arm consists essentially of this capacity in series with condenser 214. Resistor 216 being in series with the minimum capacity between rotor 222 and stator 218, and both of these being in parallel with the maximum capacity between rotor 222 and stator 220, causes only a very small phase shift in this fourth arm. When, on the other hand, rotor 222 of condenser 212 is adjusted for maximum capacity to stator 218, the fourth arm consists essentially of resistor 216 in series with condenser 222 set at this maximum capacity adjustment and with condenser 214, while only the minimum capacity between rotor 222 and stator 220 is shunted across the capacity between rotor 222 and stator 218 and resistor 216. We then have maximum phase shift. This circuit results in a very large range of adjustment of phase and capacity in the fourth arm without the use of variable resistors or excessively large adjustable condensers.

Cables 210 (Fig. 16) are made so that the effective length of each is exactly equal to ½ wave length or integral multiples thereof. The effective electrical length of a cable is readily determined by one skilled in the art and depends on various factors such as the insulating material in the cable, the geometry of the conductor, the manner in which the end of the cable is terminated, and the frequency of the energy transmitted by the cable. The effective electrical length of a cable is usually expressed in wave lengths (or fractions thereof) of the energy transmitted by the cable. Thus, if the voltages at two spaced points of the cable are in phase, the distance between these points is said to be one wave length (or a multiple thereof). If these voltages are 180° out of phase, their distance is said to be ½ wave length (or 1½ or 2½, etc.). Thus, they are the equivalent of very low resistors, and have practically no effect on the balance of the bridge. The capacity from the upper electrode E1 to ground is effectively connected across one half of coil 208. Coil 208 is of relatively low impedance, so that the samall capacity from electrode E1, to ground is not sufficient to resonate with coil 208. The capacity from E2 to ground is across the diagonal of the bridge and therefore has little effect on its balance. Both capacities of E1 and E2 to ground are held low to further reduce any effect of changes in these capacities on the balance of the bridge.

The output of the bridge is taken from junction point 221 and is inductively coupled to coil 226 through coil 224. A local oscillator voltage is capacitively coupled to wire 225 by means of the capacitive effect between the wire 225 and coil 230. Oscillator coil 230 is the tank coil for a conventional "Hartley" oscillator consisting of the elements of one triode section of dual triode 228, capacitors 234 and 236, and 231, and grid resistor 238. The local oscillator voltage is such that it is much greater than the signal voltage received from the output of the bridge circuit through coil 226. As a result changes in the local oscillator voltage have little effect on the signal.

The main oscillator and local oscillator frequencies pass through capacitor 235 to the grid of the mixer section of tube 228, which is in a conventional circuit for converting a high frequency to a lower frequency. Resistor 237 serves as the grid return and the cathode is returned to ground through capacitor 227 and resistor 229. The difference frequency between the main oscillator and local oscillator frequencies appears at the plate of the mixer across coil 240, which is permeability-tuned to the difference frequency. The voltage of this diference frequency is substantially proportional to the output voltage of the bridge circuit.

This voltage is then amplified in a three stage intermediate frequency amplifier, containing cathode degeneration for stability. Amplification occurs with tubes 244, 246 and 248. These tubes and their circuits are of conventional design having conventional components comprising coupling condensers 249, 254, 266 and 280; permeability-tuned output coils 240, 253, and 256; cathode resistors 242, 255, 269, and grid resistors 243, 257, and 267. Condensers 247, 264 and 270 are radio frequency bypass condensers for the filament circuit. Resistors 245 and 259 return the grids of tubes 244 and 246 to a positive direct voltage. Resistors 251, 261, 268, 273, 275, 277 and their associated by-pass condensers 241, 262, 263, 272, 274, 276 and 278 form a voltage divider network for supplying positive D. C. voltage to the plates and screen grids of pentode tubes 244, 246 and 248, and positive D. C. voltage to the control grids of tubes 244 and 246.

The signal appearing at resistor 271 is the amplified signal and is the difference between the frequency fed into the coil 226 from the bridge circuit H which derives its voltage from the main oscillator through coil 208, and the local oscillator frequency developed in the mixer tube 228 and mixed with the main oscillator frequency in the mixer section of tube 228. This three stage intermediate frequency amplifier is stagger-tuned to provide constant output regardless of small changes in main oscillator frequency, as is well known in the art. It will be understood that the main oscillator and/or the local oscillator could be crystal controlled to provide close control over frequency.

The signal across resistor 271 is fed to the half-wave voltage doubler rectifier tube 250 through coupling capacitor 280. Tube 250 provides more gain through its voltage doubling action, and in addition rectifies the signal, thus removing the intermediate frequency. Condensers 284, 285 and 286 are radio frequency by-pass condensers. Coil 281 is permeability-tuned to the intermediate frequency. Condensers 283 and 287 form part of the voltage doubling circuit. Choke 288 is a radio frequency choke. Meter MA is a milliammeter, and it and resistor 290 form the load for the output of the voltage-doubler rectifier, with polarity as shown. Condenser 289 is a by-pass condenser.

The rectified signal developed across meter MA and resistor 290 is fed to grid of cathode follower 260 through resistor 293. The cathode of cathode follower 260 is connected to cathode resistor 297 which is returned to a source of negative D. C. voltage to improve the linearity of response and to increase the range over which the signal may vary. For biasing the grid of cathode follower 260 a potentiometer 752 (Fig. 19) operated through knob 160 on the control box CB is connected to contacts $r$, $t$, $w$ of connector 295. Resistors 294 and 296 connected to contacts $r$ and $t$ of connector 295 are connected to a positive direct current voltage and a negative direct current voltage, and together with said potentiometer 752 (Fig. 19) in the control box CB determine the bias voltage range. The intermediate frequency signal is also fed to tube 252, which is a triode combined with an electron ray indicator. It is biased to zero shadow angle by adjusting resistor 292. The triode plate resistor 256 is by-passed by condenser 258. Thus, the triode acts as a biased detector, in the manner disclosed in the U. S. Patent 2,340,914 granted to Uncas A. Whitaker on February 8, 1944.

The power supply PS shown in Fig. 16 provides all filament voltages and both the positive and negative D. C. voltages required for proper operation of the detector circuit. To maintain the entire system at a constant operating voltage, a constant voltage transformer (not shown) may be added to the input of the power transformer 800, which is connected to the power line mains through a fuse 802 and suitable connecting plug 804. Secondary winding 806 of transformer 800 provides filament voltage for rectifier tube 808. Winding 810 of transformer 800, having a grounded center tap, is connected to rectifier tube 808 and provides a source of high A. C. voltage. The pulsating D. C. output voltage of voltage rectifier 808 is smoothed into a steady D. C. voltage by means of a conventional power supply filter which consists of condensers 812 and chokes 814. The filter is connected to rectifier tube 808 by means of the center tap connection in winding 806. A pair of voltage regulator tubes 816, having a suitable voltage rating, are connected in series in order that a voltage higher than the rated voltage of either tube operating alone may be regulated, and the series arrangement, in turn, is connected through a dropping resistor 820 to the output of the power supply filter. Resistor 820 provides the proper operating current for voltage regulator tubes 816. Resistor 820 has an adjustable tap to which is connected the main B+ or plate voltage supply line 822.

Line 822 is connected to the adjustable tap of resistor 820, through the internal jumper connections of voltage regulator tubes 816 and 818 so that removal of any of the voltage regulator tubes from the power supply will cause removal of the plate voltage from all of the electronic tubes of the detector. A condenser 824 is connected between line 822 and ground in order to provide additional filtering for the D. C. plate supply voltage. Secondary winding 826 of transformer 800 provides a low value heater voltage for all the electronic tubes of the detector and has a by-pass condenser 828 across its terminals so that stray currents in the various filament lines will be effectively by-passed to ground.

Negative voltage for biasing the cathode 260 as described above is provided by tapping winding 810 of transformer 800 at a suitable point and then rectifying the negative portions of the A. C. voltage developed between the tapped portion of winding 810 and the center tap ground connection of that winding. Rectification of the negative half cycles is accomplished by connecting the tap of winding 810 to a pair of half wave rectifiers which may be of the copper oxide or selenium type through a blocking condenser 830 and current limiting resistor 832. Rectifiers 834 and 836 are connected in such a way that only the negative half cycles of the chosen bias voltage, as measured with respect to ground, are rectified. The resulting negative voltage is then smoothed by a conventional resistance-capacitance filter comprising resistor 838 and filter condensers 840. Resistor 838 also serves to limit the current through voltage regulator tube 818, thereby determining the proper operating range of the tube 818.

The output of the detector tube 250 (Fig. 16) is indicated on the meter MA which is a visual indicator. This output is also fed to cathode follower 260 for providing a low impedance output at its cathode for operating the cigarette machine feed regulator and/or the defective cigarette rejector which will now be described, and/or any other electric or electronic device that may be desirable.

In operation, the cigarette machine is adjusted to produce average weight cigarettes. The phase and capacity controls, 212 and 214 of Fig. 16 are adjusted until the meter MA of Fig. 16 shows that the bridge is balanced under running conditions for average weight cigarettes. This balance condition is shown by the fact that the pointer of meter MA fluctuates around the zero reading, and by the fact that the shadow angle fluctuation of electron-ray indicator 252 of Fig. 16 is a minimum. This is especially advantageous because the bridge is balanced under actual operating conditions when the cigarette rod is in the process of manufacture.

Once the balance condition is established, it is necessary to unbalance the bridge a fixed amount so that it will discriminate between light and heavy cigarettes. For example, after balance is attained, if the capacity of condenser 214 of Fig. 16 is decreased, then the bridge becomes unbalanced and the meter MA will read at some value greater than zero. Since the capacity 214 has been decreased from the setting obtained for the average weight, then a cigarette lighter than average will cause the meter MA to approach zero, or a cigarette heavier than average will cause the meter to deviate even further from the unbalanced condition.

The polarity in this case turns out to be positive for light cigarettes and negative for heavy cigarettes. It is not necessary that this be so arranged and is dependent upon the connections to the voltage doubler rectifier tube 250, of Fig. 16. It will be understood that these connections are arbitrary and might just as well have been chosen in the opposite sense, so that a light cigarette would produce a negative signal and a heavy cigarette produce a positive signal. However, for purposes of standardizing, the connections have been made as described above so that a light cigarette produces a positive signal and a heavy cigarette produces a negative signal. It is to be understood that the bridge may be unbalanced at its operating point if the phase control 212 is changed from the setting obtained for an average cigarette while the capacity control remains unchanged. What has been said concerning the unbalancing of the bridge by changing capacity 214 to bring the bridge to its operating point, would also be applicable in this case.

Defective cigarette rejector

The signal just described may be effectively employed with the cigarette rejecting apparatus illustrated in Figs. 9 to 15 and the circuits shown in Figs. 17 and 18.

The rejecting apparatus employed comprises a rejecting mechanism and a timing mechanism. The rejecting mechanism is made up of two magnetically operated kickers 495 and 497 each respectively being mounted underneath one of the two delivery belts 52 to kick the cigarettes to be rejected out of the two rows of cigarettes on the two delivery belts as shown in Fig. 1A. These rejected cigarettes are caught in a funnel (not shown) which guides them into a receptacle (not shown). The operation of kickers 495 and 497 must be very fast in order not to disturb adjacent cigarettes and must be accurately timed with the operation of the machine. This timing is accomplished by the timing mechanism just mentioned which performs several functions, namely:

1. It generates, records and stores impulses whenever the detector indicates that a defective cigarette is passing the electrodes E.
2. If desired it can discriminate between flaws located in the center or near the ends of each cigarette.
3. It selects the proper row from which this cigarette must be rejected.
4. It energizes the corresponding magnetic kicker at the exact moment that the defective cigarette arrives at the proper position for rejection.

The recording and storage element consists of a disc 400 made of non-magnetic material which is driven in timed relation with the movement of the cigarette rod through the cigarette making machine. Uniformly spaced magnetizable inserts 402 and 403 made of Alnico or of a similar alloy are arranged in two concentric circles (one for each delivery belt) near the periphery of disc 400. The pins 402 and 403 are alternately located on the two circles and the disc 400 advances one pin for each cigarette produced.

When a defective cigarette is detected at the electrodes E, the signal is transmitted in the manner hereinafter described from the detector circuit DD enclosed in a suitable housing shown in Fig. 1 and finally results in the pole pieces 446 and 448 shown in Figs. 9 and 10 magnetizing the insert (or inserts) which is (or are) in between the pole pieces 446 and 448 at that moment. This insert corresponds to the cigarette in which the defect was detected. The pole pieces 446 and 448 straddle both circles of inserts and can therefore magnetize inserts located in either circle.

As the disc 400 rotates from the magnetizing station A to the pick-up station D (Fig. 9) the cigarette is forwarded in the machine from the electrodes E through the cutoff C onto the collector belts 52, which move it into the range of one of the cigarette rejectors 495 or 497 depending upon which of the two belts the cigarette is traveling. At the moment the cigarette comes into the range of the rejector 495 or 497, the corresponding magnetized insert passes between the pole piece 438 or 439 of a pick-up coil 430 or 431 (Figs. 9 and 11) and generates an impulse in the coil which causes the corresponding rejector magnet to be energized. Pole pieces 438 of coil 430 are located opposite the inserts of the inner circle, while the pole pieces 439 of coil 431 are located opposite the inserts of the outer circle. Pick up pole pieces 439 are part of a pick up assembly, consisting of pick up coil 431, with soft iron core 435, soft iron extension arms 436 and pole pieces 439. The entire assembly is supported on a non-magnetic spacer 434. This results in the cigarette rejector being actuated to reject the cigarette having the defect. Pole pieces 438 form a similar assembly with extension arms 432, a soft iron core (not shown), and coil 430 which is supported by a similar spacer (not shown).

As the disc 400 continues to rotate in the direction indicated by the arrow it passes under the demagnetizing pole pieces 426 and 428 shown in Figs. 9 and 12. The polarity of the demagnetizer is opposite to that of the magnetized insert and it consists of permanent magnet 424 with soft iron extensions 425 and soft iron pole pieces 426 and 428, which straddle both circles of inserts, the entire assembly being supported by a non-magnetic spacer 423.

The magnetizing assembly, consisting of U-shaped core 443, coils 442 and 444 and pole pieces 446 and 448, is mounted on a suitable bracket 445 which pivots on stud 404 on which wheel 400 rotates. Bracket 445 with the magnetizing assembly can thus be rotated around wheel 400. Pole pieces 446 and 448 can therefore be located in relation to inserts 402 and 403 in a position corresponding to that of the cigarette in relation to the electrodes E. Similarly, the two brackets 450 supporting the two pick-up assemblies can also be rotated around wheel 400 to actuate the rejectors when the cigarettes are in the proper locations for rejection. Bracket 445 is locked in position by screws 447 which move in an arcuate slot 449. Brackets 450 are locked in position by screws 452 moving in an arcuate slot 454, after they have been located in the desired position.

Disc 400 is driven in time with the movement of the rod through a cigarette making machine by means of the shaft 56 (Fig. 1). The shaft 56 has a bevel gear 57 mounted on the end thereof which meshes with the bevel gear 59 shown in Figs. 1 and 10. The bevel gear 59 is fixedly mounted on a shaft 412 to which is also fixed a gear 414. The gear 414 drives a pinion 410 freely mounted on the stud 408 which pinion in turn transmits driving power to the gear 406. The gear 406 is freely mounted on the shaft 404 and has fixed thereto the disc 400. It will thus be seen that because of the mechanical connection just described the disc 40 is driven from the same driving mechanism which moves the cigarette rod by means of the folding belt 22 through the cigarette making machine.

It will thus be apparent that the disc 400 rotates at a speed directly correlated with the movement of the cigarette rod through the cigarette making machine and when the electrodes E detect a defect which is of such a character as to be objectionable it causes the pole pieces 446 and 448 to magnetize one of the inserts 402 or 403 in the concentric rings. The number of inserts magnetized in this manner will depend upon the location of the defect and whether it extends to more than one cigarette and on the width of the pole pieces 446 and 448.

As the disc 400 moves away with the magnetized insert the cigarette rod having the defective portion similarly moves out of range of the electrodes E and by the time the magnetized insert reaches the pick up pieces 438 or 439, the defective cigarette simultaneously arrives within the range of rejectors 495 or 497 depending upon which collecting belt carries the defective cigarette. At this moment the magnetized insert causes an impulse to be generated in one of the coils 430 or 431 which results in the defective cigarette or cigarettes being rejected by means of the rejectors 495 or 497. In the event a defect appears in two adjoining cigarettes, an insert in each of the concentric rows will be magnetized.

It will be appreciated that in some cases it will be desirable to eliminate cigarettes which are too light or too heavy in weight while in other cases it may be desirable to eliminate cigarettes which have defects anywhere along their length. In still other cases, it may be desirable to only eliminate cigarettes which have defects at the ends of the cigarette. With the present apparatus these possibilities may be easily and readily obtained by employing magnetizing pole pieces having contours which give the results desired.

For example, the pole piece shown in Fig. 13 will be suitable for use when rejecting cigarettes which are too light or too heavy regardless of where the defect, if any, might appear along the length of the cigarette. These pole pieces will be used in conjunction with electrodes which are equal in length to a cigarette as shown in Figs. 3 and 4. The pole piece shown in Fig. 14 has a longer range which is at least equal to the spacing between two adjacent inserts located in adjacent rings and is, therefore, capable of magnetizing an insert at any time as soon as the defect is detected anywhere along the length of the cigarette. The pole piece shown in Fig. 15 is of such construction that it will only be able to magnetize an insert if a defect is detected at the ends of the cigarette. Either of the pole pieces shown in Figs. 14 and 15 will be used in conjunction with shorter electrodes as shown in Figs. 5 and 6.

The energy required for magnetizing the inserts 402 and 403 is so great that it would require a relatively larger source of D. C. power to energize coils 442 and 444 of the magnetizing unit continuously. It would also require longer control equipment. Continuous energization is not necessary however. Instead, energy is stored in a condenser 486 which is charged over a period which may be as long as that required for the rod to advance ¼ cigarette length and can be discharged through coils 442 and 444 at the proper instant in a much shorter time, giving a correspondingly high magnetizing current.

For recording short defects anywhere along the rod, the condenser discharge may come at any time and no specific timing in relation to the position of the cigarette in the electrodes is necessary. For recording cigarettes which are too light or too heavy, it is necessary to limit the opportunity for discharge of the condenser through the magnetizing coils to a very short instant, during which the cigarette is centered between the two electrodes. This is accomplished by means of a star wheel 416 which is adjustably attached to the gear 414, by means of adjusting screws 411 to permit the star wheel to be moved relative to the gear 414 to regulate its timing so that the magnetic spring member 418 will snap away from the teeth of star wheel 416 whenever a cigarette is centered in the electrodes E.

The electric circuits employed in the apparatus described above will now be described, first in connection with the rejection of light cigarettes only, then in connection with the rejection of heavy cigarettes, thirdly, in connection with the rejection of both light and heavy cigarettes and finally in connection with the rejection of cigarettes with short voids and plugs.

*Light cigarette rejection*

As stated above when light cigarettes are to be detected a pair of long electrodes E equal to the length of a cigarette such as shown in Figs. 3 and 4, are employed and a pair of pole pieces 446 and 448, such as shown in Figs. 10 and 13, are employed with the disc 400.

The signal which is generated by the detector DD (Fig. 1) described above is conducted through connector 299 and through a suitable cable 477 to a connector 478 shown in the wiring diagram illustrated in Fig. 17. When connector 299 (Fig. 16) is joined to connector 478 (Fig. 17), contact 299a of connector 299 is connected to contact 478a by means of cable 477, and contact 299b of connector 299 is likewise connected by means of cable 477 to contact 478b of connector 478. As contacts 299b and 478b are grounded, the "hot" side of the cable is connected through connector 478 to one terminal of switch 476. The signal so received from the detector DD is adjusted by means of weight control dial 160 on control box CB to a negative value. Then since light cigarettes cause the signal to become less negative or to go in the positive direction, cigarettes that are lighter than a predetermined weight will produce a signal sufficiently in the positive direction to fire thyratron 460. The dial 160 is connected to the movable tap of a conventional potentiometer 752 (Fig. 19) mounted inside of the control box CB (Fig. 1 and Fig. 19).

When the thyratron 460 fires, the voltage on condenser 486 discharges through the coils 442 and 444 to ground. The passage of current through coils 442 and 444 magnetizes whatever insert happens to be under the magnetizing pole pieces 446 and 448.

The inductance and resistance of the magnetizing coils 442 and 444, the capacity of condenser 486 and the anode resistance of thyratron 460 are so proportioned that this discharge is in the nature of a damped oscillation having a frequency determined by the inductance of coils 442 and 444 and capacitance 486 and damped by the resistance of thyratrons 460. By the time the pulse from the star wheel has died out, the grid of the thyratron is again below tripping potential because of negative voltage savings of the damped oscillation and no further current can flow through thyratron 460 until the next pulse from the star wheel magnet. Condenser 486 now starts to recharge from the high positive potential 488 which is derived from a conventional power supply 494 and this current passes from said power supply 494, through resistor 490, through condenser 486, through connectors 491 and 492, through recording coils 442 and 444 back through connectors 491 and 492 to ground. The resistor 490 keeps the current flow through the coils 442 and 444 sufficiently low to prevent magnetization of the inserts 402 and 403 during the charging cycle. The cable running between connectors 491 and 492 interconnects the housing MR for the rejector circuits with the housing MD enclosing the memory wheel 400.

The rejector circuit shown in Fig. 17 is so arranged that the signal received from the dielectric detector DD is only effective when the center of a cigarette is at the center of the electrodes E shown in Figs. 1, 3, 4 and 16. This is accomplished by shunting out the signal received from the detector DD through pentode tube 462 of the rejector circuit shown in Fig. 17 instead of allowing it to develop across the thyratron grid resistor 502. When the cigarette is centered in the electrodes E the pentode tube 462 is at cut-off in the manner described below and it no longer shunts out the signal received from detector DD. Resistor 500 is used to prevent loading down the signal circuit of the dielectric detector DD.

The pentode tube 462 is of conventional construction with sharp cut-off characteristics. When the cigarette is not centered the grid of pentode tube 462 is at ground potential through resistor 407, star wheel coil 420, and the tube is conducting.

The general purpose of the star wheel 416 is to provide a means for making the signal from the detector effective at the rejector only when the cigarette is centered in the electrodes E. When the cigarette is not centered in the electrodes E, the signal received from electrodes E has no effect on the rejector circuit as will be apparent from the description which follows.

The star wheel coil assembly comprises primarily a permanent magnet 422, a soft iron magnetic core 421, and a coil 420 for generating a sharp impulse when the spring member 418 is released from a tooth on star wheel 416. The permanent magnet 422 produces a magnetic field which passes through the core 421, spring member 418, star wheel teeth 416, stud 412 and memory wheel back plate 413 and back through permanent magnet 422. This magnetic circuit is suddenly interrupted when the spring member 418 snaps away from one tooth to the next succeeding tooth as the star wheel 416 shown in Fig. 9 rotates in the direction indicated by the arrow.

The sudden decrease in permeability of the magnetic circuit brought about by the introduction of the air gap between the spring member 418 and a star wheel tooth 416 produces a sharp change in the magnetic field and hence produces a sharp impulse of voltage in the coil 420. The coil 420 terminals are connected so that the sharp impulses are negative with respect to ground and momentarily cut off the plate current in pentode 462. Resistor 407 serves to lengthen the decay rate of the voltage generated by coil 420, thus slightly lengthening the cutoff time of pentode 462. It will thus be seen that in general the star wheel 416 in effect primarily opens a gate each time a cigarette is centered in the electrodes E so that a signal received from the detector will trip thyratron 460 if that signal is of sufficient magnitude corresponding to a light cigarette to trip the thyratron 460.

Incidentally it may be noted that the magnitude of the pulse in coil 420 is independent of the speed of rotation of star wheel 416 within a wide range, and depends solely on the stiffness and inertia of spring 418 and on the intensity of the magnetic field both of which are constant. This is important if the rejector must be operative at more than one speed of the cigarette maker. The entire memory wheel assembly is shielded against external magnetic fields with a high magnetic permeability shield 415 made, for example of Mumetal. Also the recorder coil assembly 442, 444, 446 and 448 is shielded on two sides with Mumetal, and on the other two sides by heavy gage steel. This helps to prevent the impulses which are used for magnetizing the inserts to cause unwanted pickup of these impulses by pick up coils 430, 431 simultaneously with the magnetizing of the insert.

To further prevent unwanted pickup by the pickup coils 430, 431 simultaneously with the magnetizing of an insert, condensers 461 are placed across pickup coils 430 and 431 to ground. Any voltage that appears at the coil simultaneously with the magnetizing of an insert is fairly sharp and well defined because it is the result of the discharge of condenser 486. On the other hand the voltage generated in the pickup coils 430 and 431 as a result of the rotation of the magnetized insert is not as sharp. The condenser 461 may therefore be selected to shunt out the high frequency type of impulse from the recorder, while having little effect on the lower frequency impulse from the insert due to rotation.

The wires from the coil 420 (Fig. 9) are connected through the connectors 491 and 492 to the rejector circuit through switch 464 to the control grid of pentode tube 462 and to ground. The contacts, a, b, c, d, e of connector 491 connect with corresponding contacts a', b', c', d', e' of connector 492. The switch 464 serves to switch the coil 420 into the control grid of pentode tube 462 for the purpose of cutting off said pentode tube when a cigarette is centered in the electrodes E and is connected to the terminal 465 whenever light cigarettes and light and heavy cigarettes are to be rejected.

The operation of the star wheel may be briefly described as follows. The cathode of pentode 462 is returned to a negative voltage at resistor 480. This makes the grid positive with respect to the cathode until the star wheel impulse is received. As the cigarette becomes light, the signal becomes positive. This tends to make the plate of pentode tube 462 more positive with respect to the cathode. Thus, the pentode tube 462 conducts more as the cigarettes decrease in weight, when the star wheel is not generating a sharp voltage impulse. When the star wheel produces a sharp negative impulse it is sufficient to cut off pentode 462. At this instant the full signal is developed across the resistor 502. If the signal is of sufficient magnitude corresponding to a light cigarette it will cause tripping of thyratron 460.

The tripping or firing of thyratron tube 460 permits condenser 486 which has been previously charged in the manner described above to discharge through connectors 491 and 492, recorder coils 442 and 444, back through connectors 491 and 492 to the ground. As previously stated, the passage of this current through coils 442 and 444 sets up a magnetic field which will magnetize the magnetic inserts in the memory wheel 400.

When the memory wheel 400 has traveled from the position A, where the insert is magnetized whenever a defective cigarette is detected, to the pick-up station D, the cigarette will have moved from the detector electrodes E to the rejector station where the rejectors 497 and 495 are located. Any magnetized insert, representing a defective cigarette when reaching the position D, due to their rotation, generates a voltage in pick up coils 430 or 431 which is amplified by tubes 470 or 474.

The amplifier tubes 470 and 474 comprise two-stage conventional amplifiers with degenerative feed back network comprising resistor 471, condensers 473, and 475 for the purpose of improving the stability of the amplifier stages. The components for amplifying the impulses of the magnetic inserts 402 and/or 403 includes grid resistors 479, cathode resistors 513, plate resistor 518 for the first half of double triodes 470 and 474, and grid resistors 516, cathode resistors 515, cathode by-pass condensers 517, plate resistors 519 for the second half of double triodes 470 and 474. Condensers 521 are coupling capacitors from the plate of the first half of the double triodes to the grid of the second half.

Impulses from inserts 403 in the inner concentric ring of memory wheel 400 of Fig. 9 are amplified by the circuit of tube 474, enclosed within the area 482, and impulses from inserts 402 in the outer concentric ring are amplified by the circuit of tube 470, enclosed in area 481.

Potentiometers 463 and 443 act as gain controls for varying the amount of amplification. The potentiometer controls 463 and 443 are set to provide enough voltage at the thyratrons 468 and 472 for their operation when a magnetized insert generates a voltage in a pickup coil. These controls are made variable to compensate for differences in speeds from machine to machine. This is necessary because the voltage generated by the magnetic insert as it passes under the pick-up coils 430 and 431 is a function of the magnetic insert speed of rotation which in turn is a function of the speed of memory wheel 400, which is dependent upon the machine speed.

The amplified impulse received from the magnetized inserts 402 or 403 is then applied to the control grid of thyratron 468 or 472 (or both) through coupling condensers 487 and serves to fire one of the thyratrons 468 or 472. These thyratrons are similar in operation to the recording thyratron 460 so that upon firing, condenser 504 or 506 will discharge through connectors 505, 507 through rejector coil 498 or 496 back through connectors 507 and 505 to ground. The contacts f, g, h of connector 505 are plugged into the corresponding contacts f', g', h' of connector 507. This impulse of current through coils 498 or 496 is sufficient to attract the armatures 512 and 514 and thus cause the rejector magnet arms 495 and/or 497 to move up and reject the desired cigarette or cigarettes.

The condensers 504, and 506, resistors 508 and 510, and coils 498 and 496 are so proportioned as to produce an oscillation after firing, the negative portion of which is sufficient to extinguish the thyratron 468 or 472. To further enhance this action the screen grids of thyratrons 468 and 472 are returned to a negative potential, which is derived from the power supply shown in the enclosed area 494. The power supply 494 is of conventional design, similar to power supply PS of Fig. 16, described in detail above. In order to prevent the firing of thyratrons 468 and 472 before an impulse is received from the magnetic inserts 402 and 403, it is necessary to maintain the control grids of thyratrons 468 and 472 at a negative bias. This is accomplished by means of potentiometer 484 which derives a negative voltage from a suitable source such as shown in the enclosed area 494. Thyratron grid resistors 483 and 485 serve to limit the grid current after firing.

Heavy cigarette rejection

For the rejection of heavy cigarettes alone everything that has been said concerning the rejection of light cigarettes applies, with one exception. The dielectric detector DD, after it is balanced for the average cigarette, is unbalanced in this case so that heavy cigarettes produce a positive signal, instead of a negative signal, as was the case for light cigarette rejection. To obtain a positive signal for heavy cigarette rejection, it is only necessary to unbalance capacity 214 to the operating point of the bridge circuit Fig. 16 so that more capacity is added to the bridge.

Light and heavy cigarette rejection

When it is desired to reject cigarettes that are too heavy as well as cigarettes that are too light, the circuit shown in Figure 18 may be employed. In this case the signal of the dielectric detector DD is adjusted by means of the weight control dial 160 (Figure 1), so that the average weight of cigarettes desired produces zero voltage at the connector 520. The connector 520 shown in Figure 18 is also connected by means of a suitable cable to connector 299 of Figure 16, similar to the cable connection of connector 478 to connector 299. That is, contact 520a of connector 520 is connected by means of a suitable cable 850 to contact 299a of connector 299, and contact 520b of connector 520 is also connected to contact 299b of connector 299.

The bridge is unbalanced in the same manner as previously described for rejection of light cigarettes so that if the cigarettes being manufactured tend to become light in weight, the signal becomes positive and if the cigarettes become heavy in weight the signal becomes negative as previously described. Tube 522 is a phase inverter of conventional design connected to a suitable source of D. C. voltage 544 so that a negative change in the input signal received from the detector DD through connector 520 and 299 (Figure 16) results in a positive change at the plate 524 of tube 522. The signal at plate 524 is then fed to a cathode follower tube 526 which serves to prevent loading down the output circuit of triode tube 522 and also provides a low impedance output at the cathode of the cathode follower 526.

By means of a battery 528 the positive signal obtained at the cathode of triode 526 is adjusted to a negative value for feeding into the recording thyratron 460 shown in Figure 17 in the manner described in connection with the rejection of light cigarettes. Tube 530 is a double diode and is so connected that if plate 532 of tube 530 is positive enough to allow conduction because of heavy cigarettes, then plate 534 must be negative enough to prevent conduction, since both plates are affected by the same signal. Diode tube 530 therefore serves to prevent the interaction of voltages from the light and heavy or positive and negative portions of the signal. In other words as the signal from the dielectric detector DD becomes negative at the connector 520 it becomes more positive at plate 524 of triode 522 and also more positive at the center tap of potentiometer 536 while it gets more negative at the center tap of potentiometer 538. Therefore both halves of the diode 530 are never conducting at the same time.

Battery 540 serves to increase the range of negative signal voltages over which the triode tube 522 may be operated. Terminal 542 of connector 543 is connected to the rejector input by means of a suitable cable 552 to contact 478a of connector 478 of Figure 17 and is held at a negative potential by means of potentiometer 480 Figure 17 of the rejector circuit. Therefore plates 532 or 534 of double diode 530 must attain a potential slightly greater than the negative potential provided at potentiometer 480 of the rejector circuit before conduction begins. Once conduction begins the signal level will determine whether the recorder thyratron 460 (Figure 17) will fire.

The star wheel 416 acts in the same manner as described in connection with the rejection of light cigarettes with one exception. When both halves of the diode 530 are non-conducting there is no signal present at the rejector input connector 478. Therefore the pentode 462 which is non-conducting at the instant when a sharp impulse is delivered to the control grid, is not acting upon the signal. However this is of no consequence. Also recording thyratron 460 does not fire when the diode 530 is not conducting as it is held at a negative bias by means of the potentiometer 480. Once the diode 530 starts to conduct the recording thyratron 460 will not fire unless the sum of the signal voltage and the bucking voltage at the center tap of potentiometers 536 or 538 is sufficient to overcome the bias from the potentiometer 480 of Figure 17, when the cigarette is centered in the electrodes.

Gang switches 548 and 550, each having a pair of ganged contacts and armatures respectively, permit rejection of light and/or heavy cigarettes. To reject both light and heavy cigarettes both gang switches 548 and 550 should be closed and for rejecting either light or heavy cigarettes alone, the corresponding light switch 550 or heavy switch 548 should be closed while the other remains open.

It will therefore be apparent that if a cigarette heavier than a predetermined amount is centered in the electrodes E a negative signal is obtained at connector 520. This signal passes through battery 546, center tap of potentiometer 538 and plate 534 of diode 530 and has no effect on the circuit since the diode 530 is rendered non-conducting by the negative signal voltage obtained from connector 520. On the other hand if this same negative signal becomes inverted at plate 524 of triode 522, it is delivered to the grid 547 of cathode follower tube 526 and appears at the cathode 551 in phase and hence still positive, and therefore raises the potential at center tap of potentiometer 536 in a positive direction. This therefore raises the potential at plate 532 of diode 530. If the increase is sufficient this permits conduction through the diode 530 and therefore allows this positive signal voltage to raise the thyratron 460 grid voltage to the point where the thyratron 460 fires and magnetizes one of the magnetic inserts of memory wheel 400.

When the heavy cigarette is centered in the electrodes E the grid of the thyratron 460 is brought to an increased positive potential because of the action of the star wheel 416 which is at this time making pentode tube 462 non-conducting, which allows the entire signal to act on thyratron 460 as described for the rejection of light cigarettes.

When the insert is magnetized in the manner described it results in the heavy cigarette being rejected by one of the rejectors 495 or 497 when it arrives at the rejecting station.

When the cigarette becomes lighter than a predetermined amount, determined by the setting of potentiometers 538, then the signal becomes positive at connector 520. This positive signal is inverted at plate 524 of triode 522 and hence appears at plate 532 of diode 530 as a negative signal making this half of the diode 530 non-conducting. On the other hand the positive signal received from connector 520 raises the potential at center tap of potentiometer 538 and at the plate 534 of diode 530, thus permitting conduction through the diode 530, thereby allowing the positive signal voltage to raise the thyratron 460 grid voltage to the point where the thyratron 460 fires and magnetizes one of the magnetic inserts of memory wheel 400.

When the light cigarettes are centered in the electrodes the grid of the thyratron 460 is brought to an increased positive potential because of the action of the star wheel 416. At this time pentode tube 462 is non-conducting which allows the entire signal to act on thyratron 460 as described for the rejection of light cigarettes.

When the insert is magnetized in the manner described it results in the light cigarette being rejected by one of the rejectors 495 or 497 when it arrives at the rejecting station.

It should be noted that while the circuit (Figure 18) just described functions in a manner similar to the circuit (Figure 17) described for the rejection of only light cigarettes, the weight control dial when set for rejecting light and heavy cigarettes is set so that the detector signal at connector 520 is zero for the average weight of cigarettes, whereas when the circuit shown in Figure 17 is used for the rejection of light cigarettes alone the weight control dial is set to deliver a negative voltage.

For setting reject limits (that is the setting for rejecting cigarettes heavier or lighter than a predetermined amount), adjustment is made by potentiometers 536 and/or 538.

*Rejection of cigarettes having voids, plugs or loose ends*

In the foregoing description dealing with the rejection of light cigarettes and the rejection of light and heavy cigarettes the pole pieces having a shape such as shown in Figure 13 were employed. The shape of the pole pieces in Figure 13 were chosen to aid in the centering of the cigarette in the electrodes and in concentrating the flux. This is accomplished by designing the width of the pole pieces so that the flux developed is concentrated on one of the magnetic inserts and does not fringe over to an adjoining insert. In addition since the tip of the pole piece is narrowed down, the synchronizing of the memory wheel to the machine is facilitated as the pointed pole pieces are easily located with reference to the magnetic inserts. When it is desired to reject cigarettes having voids or plugs this can be readily done by substituting magnetizing pole pieces of a shape such as that shown in Figures 14 and 15.

Short electrodes, such as shown in Figures 5 and 6 are used with the detector DD, when it is desired to reject voids, plugs or loose ends. These electrodes E are shorter than the length of a cigarette and their length depends upon the size of void, loose end or plug it is desired to detect and reject. When it is desired to reject cigarettes with loose ends, voids, and plugs, the circuit shown in Figure 18 for rejecting light and heavy cigarettes may be used. When it is desired to reject only voids and loose ends the circuit shown in Figure 17 for the rejection of light cigarettes may be used. In both instances the voltage generated by the star wheel 416 is removed by throwing switch 464 to terminal 467. If desired when using the circuit shown in Figure 18 loose ends and void rejection exclusive of plug rejection may be obtained by opening switch 548 of Figure 18 and holding switch 550 closed or vice versa.

When operating to detect and reject for voids and/or plugs the magnetizing coils 442 and 444 may have to be magnetized at any time, not just when the center of a cigarette is between the electrodes. Therefore the voltage from the star wheel is removed by connecting switch 464 to terminal 467 which connects the grid of tube 462 directly to ground. As the cathode of tube 462 is always at a negative potential in relation to ground, tube 462 now acts in effect as a diode shunt on the original.

The sliding contact on potentiometer 480 is adjusted to a potential at which thyratron 460 will trip (assuming a positive signal) and due to the oscillatory characteristics of its anode circuit which was previously mentioned, it will act as an oscillator at a frequency determined by the adjustment of potentiometer 480, as long as the signal remains more positive than the sliding contact of potentiometer 480. The purpose of this arrangement is to prevent the frequency from increasing for a more positive signal, which would reduce the energy in the discharge of condenser 486 to a value no longer sufficient to magnetize the inserts in wheel 400.

The frequency chosen is such that as many as four to six magnetizing impulses can be obtained for each cigarette length. The maximum allowable frequency is that at which condenser 486 charges to a voltage just sufficient for the magnetization of the inserts 402 and 403.

Due to the construction of the pole pieces shown in Figure 14 the magnetic inserts will be magnetized immediately whenever a void is detected in the cigarette rod as it passes between the electrodes E.

If the width of the pole pieces is such as shown in Fig. 14 that there can be two inserts in between them at the same time, one from each circle, two inserts will be magnetized and two cigarettes rejected if a void or plug occurs at the end of one cigarette and the beginning of another, but only one if it occurs in the center of a cigarette. If it is desired to reject only cigarettes with loose ends, but not to reject if voids occur in the center of a cigarette, the center part of the pole pieces is cut away as shown in Fig. 15. In this case two cigarettes will always be rejected for each end void which is of course correct.

For the case where it is desired to both regulate and reject, it is necessary to set the output of the dielectric detector DD to zero for the average weight by means of the weight control. The dielectric detector DD has been adjusted by means of the capacity and phase controls 214, 212 of Figure 16 to produce a balance at meter M of Figure 16, and the bridge has been unbalanced by reducing the capacity.

Under these conditions the signal fed to the regulator and rejector fluctuates around zero, and may be used for both regulation and rejection as previously described in connection with the feed regulator and also in connection with the rejection of light and heavy cigarettes.

*Feed regulator*

The feed regulator which will now be described embodies a number of features which can be advantageously employed in many fields. These features are shown and claimed in a copending application filed by William J. Broekhuysen and Samuel Gilman, S. N. 148,661; on March 9, 1950. Since this feed regulator is particularly well adapted for use with a cigarette making machine, we will now describe how the detector disclosed herein may be used to regulate the feed of a cigarette making machine through such a feed regulator.

The feed regulator circuit (Fig. 19) which causes more or less tobacco to be fed acts essentially as an electronic switch which energizes the correcting motor 144 when the detector signal indicates a weight deviation greater than a predetermined deviation of the cigarette weight from its desired value for an uninterrupted period greater than a predetermined length of time. The polarity of this signal is used to determine the direction in which the correcting motor 144 will operate and the amount of correction is controlled by the length of time that the weight deviation persists, or by any combination of the amount of deviation, the rate of change of deviation and the time that the deviation persists. An averaging circuit is used so that the regulator operates from the equivalent average weight of a number of cigarettes. Also, to prevent the regulator from trying to correct for short time variations in average weight with which it is difficult to cope, a waiting interval is first instituted when the averaged signal exceeds the value which is predetermined as the point at which the regulator will operate. This value is called the "operating point" of the regulator. The operating point, for example, may be that signal value which corresponds to a cigarette weight 2% above or below the required weight. The following description applies to corrections which depend on the length of time that the weight deviation persists.

When a change is made in the speed of the feed F, it takes an interval of time for this change to become apparent at the detector electrodes E. This total time is made up of the time required for the changed flow of tobacco to go from out of the concave 76 through the forming mechanism of the cigarette machine M and through the electrodes E, plus the time required to change the speed of the feed F which is made up of slippage of belts, sheeves, backlash, and the effects of inertia and friction. It is therefore necessary to wait at least this interval of time after making the correction to see what the effect of this correction has been before further corrections are made. For this reason the corrections are made in the form of discrete adjustments with a waiting time between each adjustment. This interval may be made the same as the initial waiting time or may be greater or smaller. If, during an interval between corrections, the signal should become less than the "operating point," a full initial waiting period is again started as soon as the operating point is again exceeded. If during a correction, the signal should become less than the "operating point," the correction will immediately cease, and a full initial waiting time is instituted as soon as the operating point is again exceeded.

If the cigarette rod R ceases to move through the electrode E due to some failure in the cigarette making machine, the detector DD would normally either measure a rod R having an insufficient quantity of tobacco as in the case where there is no rod between the electrodes, or it will measure a cigarette rod R of constant weight as would be the case if the rod become stationary between the electrodes. If the portion of cigarette rod R which became lodged between the electrodes E were over weight or under weight or if the rod R was entirely missing from between the electrodes E, the regulator FR would normally automatically adjust the feed F to compensate for the measurement made. This action on the part of the regulator FR in such a case would be erroneous and to eliminate this possibility from occurring, a circuit called the "lockout" (Fig. 19) is incorporated which disconnects the regulator FR whenever the rod R ceases its motion between the electrodes E, regardless of whether the rod R is or is not between the electrodes E.

In Fig. 19 the contacts j', k', m', n', r', t', w' of connector 600 connects the regulator FR to the corresponding contacts j, k, m, n, r, t, w of connector 295 (Fig. 16) of the dielectric detector DD (Fig. 1) by means of a suitable cable (not shown). The signal is brought from the detector DD and after passing through the averaging circuit consisting of resistors 604 and 606 and condensers 608 and 610, it is impressed on the grid of a triode section 602 of a dual triode tube 601. This triode section 602 also acts as a cathode follower to electrically isolate the feed regulator circuit (Fig. 19) enclosed in housing FR from the detector DD or other signal source. The cathode resistor consisting of potentiometer 612 and series resistor 613 are connected to a suitable negative voltage from any suitable source such as from detector DD. The slider of the potentiometer 612 is connected to one terminal of a double pole, double throw switch 615, one moving blade 614 of which connects with the input circuits of two thyratrons 616 and 618. The thyratrons 616 and 618 have separate biases, both A. C. and D. C. The bias for thyratron 616 is obtained from potentiometer 624 across the D. C. power supply 620, and an A. C. bias in series with it is obtained from a potentiometer 627 across the insulated transformer winding 628. Condenser 842 provides a low impedance ground return for the A. C. bias current. The bias of thyratron 618 is obtained from potentiometer 626 across D. C. power supply 622 and an A. C. bias obtained from a potentiometer 629 across the insulated transformer winding 630.

The input to thyratron 616 goes through its bias and resistor 632 to its control grid; the cathode of that tube 616 being at ground potential. The input to thyratron 618 goes through the biases to its cathode; the grid of that tube 618 being grounded through resistor 634. The plates of the two thyratrons 616 and 618 are energized by A. C. through separate transformer windings, namely thyratron 616 from winding 636 and that of thyratron 618 from winding 638. The polarity of the A. C. biases and the A. C. plate voltages for both thyratron tubes 616 and 618 are so adjusted that the grid to cathode A. C. voltage is negative when the plate to cathode A. C. voltage is positive.

Potentiometer 612 is adjusted so that the voltage of its slider is zero with respect to ground when a normal weight cigarette is in the electrode, and when the biases on thyratrons 616 and 618 are so adjusted, neither thyratron "fires" under these conditions. Then if a signal comes from the detector DD so that the slider of potentiometer 612 becomes positive and of large enough value its effect will be to "fire" thyratron 616, and increase the bias on thyratron 618, to prevent thyratron 618 from firing also.

Similarly if a negative signal comes from the detector DD, so that the voltage at the slider of potentiometer 612 becomes negative enough, it will fire only thyratron 618 and increase the bias on thyratron 616. As a further precaution against both thyratrons 616 and 618 firing at the same time the plate voltage polarities are so adjusted that the plate of thyratron 618 is positive with respect to its cathode when the plate of thyratron 616 is negative with respect to its cathode.

The use of the A. C. bias in addition to the D. C. bias allows the thyratrons 616 and 618 to fire for almost a full half-cycle of the plate voltage, and allows the thyratrons 616 and 618 to be adjusted so that their operation is almost independent of line voltage variations. This is so because a variation in the A. C. plate voltage is more or less compensated by a proportional change in the A. C. bias. In the plate circuit of thyratron 616 is a relay 640 which is energized when thyratron 616 "fires," and similarly relay 642 is energized when thyratron 618 "fires."

Two triode sections 644 and 646 of tube 645 comprise with their accompanying components a multivibrator. This multivibrator is used to establish the initial waiting time after a deviation in weight has passed a set value; to establish the length of time that the correcting motor 144 is energized; and to establish the interval of time between successive corrections. The plates are energized from the D. C. power supply 647 and in the plate circuit of triode 644 is a relay 648, while in the plate circuit of triode 646 is a resistor 650 whose resistance is the same as that of the coil of relay 648. When triode 644 is conducting, the relay 648 is energized and from multivibrator action, triode 646 is not conducting. Similarly when triode 646 is conducting, triode 644 is not conducting and relay 648 is not energized. Relay 648 is used to energize the correcting motor 144.

Potentiometer 652 and condenser 654 determine the time that triode 644 conducts and therefore how long relay 648 is energized. This therefore determines the length of time that the correcting motor 144 is energized and is called the "on" time. Potentiometer 656 and condenser 658 determine the time triode 644 does not conduct and is therefore the "off" time. Potentiometers 652 and 656 are variable so that the "on" and "off" time can be adjusted and the sliders of the potentiometers 652 and 656 are returned to the D. C. power supply voltage 647 through resistors 660 and 662 to make the transition operation of the multivibrator precise.

It is seen that the cathodes of the multivibrator are returned to ground potential through resistor 664. This determines the initial waiting period. When neither of the thyratrons 616 and 618 are conducting, one contact 642c of relay 642 and one contact 640c of relay 640 are closed and in series and connect the grid of triode 644 to ground. Because either triode 644 or triode 646 is conducting currents of the same magnitude, the cathodes of triode 644 and triode 646 are positive with respect to ground by the amount of the voltage drop of this current through resistor 664. If the grid of triode 644 is held at ground potential, it is negative with respect to its cathode and triode 644 cannot conduct. This means that triode 646 must conduct.

If either thyratron 616 or 618 fires, either relay 640 or relay 642 will be energized and the grid of triode 644 will be disconnected from ground and will start to approach its cathode potential at a rate determined by the time constant of the effective part of potentiometer 656 and condenser 658. This means that relay 648 will not be energized until a definite time after relay 640 or relay 642 have become energized. This time is determined by the value of the resistance 664 compared to resistance 650, and will be approximately equal to the "off" time when it has the same value as resistance 650.

Two windings 670 and 672 of a condenser type squirrel cage motor 144 are schematically shown in lower right hand corner of Fig. 19. Winding 670 is a high resistance, auxiliary winding, whereas winding 672 is the connected, low resistance winding. These windings 670 and 672 are so connected to the contacts of a reversing contactor which consists of two contactors 666 and 668 that the correcting motor 144 (which is used to operate a variable speed drive such as the variable ratio pulley 152 shown in Fig. 1), will rotate in one direction when contactor 666 is energized and in the other direction when contactor 668 is energized. Rectifier 674, resistor 676 and condenser 678 operate to apply a braking action to the motor 144 when it is deenergized, so that a minimum of coasting results after the motor 144 is deenergized. When the motor 144 is energized in either direction the condenser 678 is charged up through the rectifier 674 and resistor 676. When the motor 144 is deenergized the condenser 678 is preferably discharged through the low resistance winding 672 of the correcting motor 144. It has been found however that a braking action will be effected on the motor 144 if the condenser 678 is discharged through either of the windings 670 or 672 but as just stated it is preferable to use the low resistance winding 672 because the stopping action has been found to be somewhat more prompt than when the high resistance winding 670 is employed.

The operation of the major portion of the feed regulator circuit will now be described.

When the material such as a cigarette rod R passing between the electrodes E deviates from the required weight it causes a corresponding averaged electrical voltage deviation to appear at the grid of triode 602. This voltage deviation will cause the voltage at the slider of potentiometer 612, which had been set at ground potential for a normal cigarette, to change in the same polarity and approximately the same amount. Due to the adjustments of the D. C. bias potentiometers 624 and 626, this voltage deviation will have no effect on thyratrons 616 or 618 until it exceeds a preset value. If the voltage deviation is positive and greater than this value, thyratron 616 will "fire" and thus energize relay 640. This causes the contacts 640c of relay 640 to open thereby disengaging the grid of triode 644 from ground and starts the initial waiting period mentioned above.

At the same time contact 640b partially completes the circuit of the contactor 668 side of the reversing contactor for energizing. At the end of the initial waiting period, triode 644 starts conducting and triode 646 ceases conducting and relay 648 is energized. The contacts of this relay 648 complete the circuit for contactor 668 and it becomes energized and the correcting motor 144 starts to operate, and the brake condenser 678 starts to charge. At the end of the on period triode 646 starts conducting and triode 644 ceases conducting, and relay 648 is de-energized which then de-energizes contactor 668. This de-energizes the correcting motor 144 and at the same time connects the charged condenser 678 across winding 672 thus supplying a surge of direct current which effects a braking action on the motor.

If the original weight and voltage deviations are still maintained so that thyratron 616 is not interrupted in its firing, a full off period will result and then triode 644 will conduct again and re-energize the correcting motor 144 in the manner stated above. However, if at any time within this cycle, the voltage deviation should decrease below the minimum value, thyratron 616 will immediately stop "firing" (because of the A. C. plate voltage), relay 640 will be de-energized, and the grid of triode 644 will be grounded, thereby reestablishing the conduction in triode 646 regardless of where in the cycle it had been and therefore the initial waiting period is re-established for any future operation.

If the voltage deviation be negative with respect to ground and greater than the minimum value, then a similar series of actions results except that thyratron 618 "fires," and relay 642 and contactor 666 are energized, and the motor 144 when energized finally by relay 648 will rotate in the opposite direction.

These directions of operation are so established that they change the ratio of the variable ratio pulley 152 so as to change the speed of the variable ratio transmission 152 so that the speed of the feed and therefore the amount of tobacco fed is increased when the original voltage deviation shows the cigarettes are too light, and decreased when the cigarettes are too heavy.

The variable ratio pulley 152 has maximum and minimum limits beyond which it cannot be adjusted. If the variation in average cigarette weight is sufficiently great this limit of adjustment may be reached, and if further adjustment in that direction were attempted, the variable speed transmission 152 would not operate. To prevent this from happening, limit switches 680 and 682 (Fig. 19) operated from the correcting motor 144, are incorporated in the motor operating circuit so that when the limit in one direction is reached it disconnects the reversing contactor 666 or 668 for that direction so that no further corrections in that direction can be made but continues to allow corrections to be made in the opposite direction. At the same time that the limit switch 680 or 682 disconnects the motor 144, it energizes one of the indicating lights 684 or 686 on the control panel. This informs the machine operator to turn the hand wheel 98 (Fig. 2) of the variable speed drive described heretofore in the required direction to bring the feed within the automatic range of the regulator.

The indicating lights 688 and 690 on the control panel are energized at the same time that either contactor 666 or contactor 668 are energized and light up to show when a correction is made and in what direction. This is a visual indication of the operation of the correcting motor 144. Indicating lights 692 and 694 are mounted on the regulator panel to show when relays 640 and 642 are energized and allow for visual adjustment of the operating points.

The lock out circuit previously mentioned is comprised essentially of a triode 696, a diode 698, a triode 700 and a relay 702. The signal comes from the detector DD (not averaged) to the grid of triode 696 through condenser 704. The combination of condenser 704 and resistor 706 comprises a differentiating circuit, and allows only the alternating component of the detector signal to appear at the grid of triode 696. When the cigarette rod R ceases movement, whether it remains in the electrodes E or not, no signal will therefore appear at this grid.

Triode 696 with the resistors 708 and 710 constitutes an amplifier which is then resistance capacitively coupled to a diode 698 through condenser 712 and resistor 714. The diode 698 is so connected that only the negative portion of the A. C. signal can pass through and this negative portion is accumulated in an accumulator circuit comprising condenser 716 and resistor 718 which is connected to the grid of triode 700 through a current limiting resistor 720.

If the cigarette rod R is traveling at normal speed through the electrodes E, there is enough variation in weight to produce an A. C. component of the signal. This A. C. component is removed from the D. C. component, amplified, and the negative portion is accumulated and applied to the grid of triode 700 in the plate circuit in which is relay 702. Enough negative potential is accumulated to prevent triode 700 from conducting and relay 702 is not energized. When the cigarette rod ceases moving, there is no A. C. component of signal, and the accumulator condenser 716 discharges through resistor 718 until the grid of triode 700 approaches its cathode potential. This allows triode 700 to conduct and energize relay 702. This causes contact 702a to open thereby de-energizing the power circuit to the correcting motor 144, preventing any further correction regardless of other operation of the electronic circuit. When this occurs indicating lights 728 and 730 are energized.

The values of condenser 716 and resistor 718 are so chosen that with the amount of A. C. signal available from a normally moving rod, the triode 700 is prevented from conducting. These values could be changed to accommodate other variations produced by materials other than a tobacco rod.

A further circuit called a "cut-out" is incorporated to prevent the regulator FR from being energized immediately after the cigarette machine is restarted after a stop. When a cigarette machine is started from a stop, there is usually a transient period of non-representative average weights during which the regulator should not be operative.

This "cut-out" circuit consists of relay 722 energized by D. C. voltage received from bridge rectifier 844. The relay is de-energized when the lock-out relay 702 is energized, and cannot become energized again, even when 702 is re-energized, except by operating push buttons 724 or 726. When this cut-out circuit is de-energized preventing action of the regulator, indicating lights 732 and 734 are energized. If desired a timing relay could be used instead of the push buttons 724 and 726 to reenergize the cut-out relay 722 a definite time after the cigarette rod starts its normal travel through the electrodes E.

Push buttons 736 and 738 have been provided to shut off the regulator FR even when the cigarette rod R is operating normally without affecting the electronic circuits in the event it is not desired to have the regulator operate on certain types or batches of tobacco placed in the feed hopper.

An auxiliary relay 740 operates from the lock-out and cutout relays to stop the machine when the cigarette rod R stops moving between the electrodes E by interrupting the machine drive motor starting circuit enclosed in box 742 (Fig. 19). Box 742 contains a conventional motor start circuit having start and stop buttons and a relay holding circuit across the start contactor. Thus the start circuit is connected to the power lines through connecting plug 854. In series with one side of the line are the contacts closed by the armature of relay 740, connected to the line through plug 856. Also in series with the same side of the line as the contacts of relay 740 are a stop button 858, and a start button 860 with associated contacts. Connected across the start button 860 and through a pair of normally open contacts on relay 862 is a shunting line which provides a holding circuit for relay 862 after the start button is pressed and the relay is energized. Relay 862 has a second pair of normally open contacts which are closed when relay 862 is energized. This pair of contacts is connected to the same side of the line as the start and stop buttons so that when relay 862 is energized these contacts act as the starting switch for operating motor M shown in Fig. 1. The output of starter box 742 is connected through plug 864 by means of a suitable cable to motor M in Fig. 1. The connections Ma and Mb as shown in Fig. 19 are connected to terminals Ma and Mb on motor M as shown in Fig. 1. When relay 702 is energized it de-energizes the starter and when 722 is de-energized it prepares the drive motor circuit 742 for re-energizing when start-button in the motor circuit disposed in box 742 is depressed.

A test voltage circuit is provided to allow the regulator values and operating points to be adjusted without taking into account the operation of the cigarette machine or signal source. This comprises the D. C. power supply enclosed by box 744 (Fig. 19), and dual potentiometer 746 so connected that when the moving blade of double pole-double throw switch 615 is connected to it at the point shown, a positive or negative potential can be applied to the inputs of thyratrons 616 and 618. This voltage is variable by means of the sliders on dual potentiometer 746. At the same time that switch blade 614 of switch 615 is set on the test position, another arm 611 of the same switch disconnects the cathode of lock-out triode 700 from ground and prevents it from conducting. This allows the regulator FR to operate without a cigarette rod R. The correcting motor 144 can be energized if desired and all other functions of the regulator FR can be pursued by means of this test signal.

An indicating meter 748 with its calibrating resistor 750 is used to indicate the polarity and magnitude of the signal being applied to thyratrons 616 and 618. A weight adjustment potentiometer 752, which is connected to the detector DD through connector 600 is used to adjust the operating zero of the regulator by varying the bias on the grid of the output tube 260 of detector DD.

The heater of the thyratron 618 is connected to its own power source-transformer winding 754 while the heaters of all the remaining tubes are connected to the center-tap grounded winding 756.

The feed regulator circuit is connected to a suitable source of power (not shown) by means of a plug 764. Switches 758 and 760 are used to turn the equipment on and off. Switches 758 and 760 are so connected that regardless of which is turned on first, the filament and D. C. bias circuits are first energized, and similarly when both are on, the first one turned off de-energizes the plate circuit voltages first.

Power for the detector DD is obtained from the power (source) through the plug 766 and switch 762. A line voltage regulator 768 is employed to maintain heater and bias voltages at a constant value regardless of line voltage variations. Fuses 770, 772 and 774 are employed for protecting the various circuits of the regulator.

The invention above described may be varied in construction within the scope of the claims; for the particular device selected to illustrate the invention is but one of many possible embodiments of the same. The invention, therefore, is not to be restricted to the precise details of the structure shown and described.

What is claimed is:

1. The method of detecting the condition of a cigarette rod as it is being manufactured in a cigarette making machine, said method comprising, passing a cigarette rod having a pasted seam extending along its length between spaced electrodes, locating these electrodes so that one of them is directly over and is adapted to straddle the seam of the cigarette rod to minimize the effect of the pasted seam on the dielectric field, impressing across the electrodes an alternating voltage of not less than 50 megacycles so that the impedance of a condenser formed by the electrodes and the portion of said cigarette rod passing between said electrodes is substantially independent of the geometric distribution of the tobacco in said cigarette rod, connecting said electrodes to an electrical impedance measuring bridge so that said condenser formed by the electrodes and the portion of said cigarette rod passing between said electrodes comprises at least one arm of said bridge amplifying said measurements to obtain a signal, and then mechanically using said signal to operate a control after it reaches a predetermined intensity.

2. The method of detecting the condition of a cigarette rod as it is being manufactured in a cigarette making machine, said method comprising, feeding tobacco to form a continuous stream, enclosing said stream of tobacco in a paper tape, applying paste to one edge of said paper tape and folding it about said stream to form a cigarette rod, advancing said cigarette rod between spaced electrodes, orienting said electrodes with respect to the seam of said rod so that the dielectric field between the electrodes passes through the thinnest cross sectional area of said tape to thereby minimize the effect of said paste on the dielectric field, impressing across the electrodes an alternating voltage of not less than 50 megacycles so that the impedance of a condenser formed by the electrodes and the portion of said cigarette rod passing between said electrodes is substantially independent of the geometric distribution of the tobacco in said cigarette rod, connecting said electrodes to an electrical impedance measuring bridge so that said condenser formed by the electrodes and the portion of said cigarette rod passing between said electrodes comprises at least one arm of said bridge amplifying said measurements to obtain a signal, and then using said signal to operate a control after it reaches a predetermined intensity.

3. The method of rejecting defective cigarettes in a continuous rod cigarette making machine which comprises, mounting magnetizable units on a traveling member at regularly spaced intervals, moving said magnetizable units past a magnetizing station at a rate corresponding to the rate at which cigarettes are made in the cigarette making machine, positioning electrodes, which are shorter than the length of a cigarette opposite the sides of said cigarette rod, impressing an alternating voltage having a frequency of at least 50 megacycles across said electrodes, measuring the change of capacity of said electrodes due to the rod having selected defects therein passing past said electrodes, amplifying the said measurement of capacity and using said amplified measurement each time it exceeds predetermined limits to energize magnetizing pole pieces having shaped characteristics such as to only magnetize a unit when a cigarette has a selected defect, making removal of the cigarette desirable, detecting that a unit has been magnetized at a station spaced from the point where the magnetizable unit was magnetized and using said detection to operate a cigarette rejector to remove the defective cigarette when it arrives in the range of said cigarette rejector.

4. The method of making stranded articles of manufacture having a substantially uniform density, comprising feeding a non-uniform continuous length of heterogeneous, randomly distributed stranded material along a path of travel, subjecting successive increments of said stranded material to an alternating voltage having a frequency of at least 50 megacycles impressed across a pair of electrodes such that the impedance of a condenser formed by the electrodes and each successive increment of the length of material moving between said electrodes is substantially independent of the geometric distribution of the strands of said material in the space between the electrodes, cutting and forming said length of material into discrete portions to make articles of manufacture having substantially uniform lengths therefrom, identifying for separation and segregation the portions of said continuous length of material containing increments having a density varying from a predetermined value as represetend by changes in said voltage, and segregating said identified portions from the remainder of said discrete portions, whereby each of said remaining portions contains a substantially uniform density of material therein.

5. The method of making cigarettes having tobacco fillers of substantially uniform density, comprising feeding a cigarette rod along a path of travel, subjecting successive increments of said rod to an alternating voltage having a frequency of at least 50 megacycles impressed across a pair of electrodes such that the impedance of the condenser formed by the electrodes and each successive increment of the rod moving between said electrodes is substantially independent of the geometric distribution of the strands of tobacco filler in said increment of said rod, cutting and forming said rod into cigarettes, identifying for separation and segregation the cigarettes containing said increments having a density varying from a predetermined value as represented by changes in said voltage, and segregating said identified cigarettes from the remaining portion of said cigarettes made from said rod, whereby each of said remaining cigarettes contains a substantially uniform density of tobacco filler.

6. In a continuous rod cigarette making machine, a detector for detecting defects in the cigarette rod, a memory device actuated each time at defect occurs at or in the vicinity of certain points in the rod at which it will be severed and which is maintained free from actuation when the defect appears in a portion of the rod between points at which it will be severed, a drive for operating said memory device in time with the movement of the cigarette rod through the cigarette making machine, and a cigarette rejector operated through said memory device each time a cigarette with a defect at or in the vicinity of said points of the cigarette arrives at the rejecting station to remove the defective cigarette.

7. A memory device comprising, an endless traveling member made of non-magnetic material, one or more rows of magnetizable members mounted on said member at predetermined intervals, pole pieces mounted on opposite sides of said traveling member at a predetermined position past which said magnetizable members are moved, a second set of pole pieces mounted on opposite sides of said member at a position spaced from said first mentioned pole pieces and alongside the path of travel of said magnetizable members, a drive for moving said travelling member at a rate correlated with the speed of travel of the material having defects which are to be detected, an impulse generating device, means selectively responsive to impulses from said generating device for causing said first named pole pieces to individually magnetize one of said magnetizable members each time a defective portion of said material is detected and an impulse is received from said impulse generating device, means connected to said second set of pole pieces constructed and arranged to be actuated by the magnetized members as they pass said second set of pole pieces, and a demagnetizer positioned between the first set and second set of pole pieces for demagnetizing the magnetizable members after they leave the second set of pole pieces before coming into the range of the first set of pole pieces.

8. A memory device comprising, a traveling member made of non-magnetic material, magnetizable inserts mounted in said member at predetermined intervals, pole pieces mounted on opposite sides of said member at a predetermined position past which said inserts are moved, a second set of pole pieces mounted on opposite sides of said member at a position spaced from said first mentioned pole pieces and alongside the path of travel of said inserts, a drive for moving said traveling member at a rate correlated with the speed of travel of the material having defects which are to be detected, an impulse generating device, means selectively responsive to impulses from said generating device, for causing said first named pole pieces to individually magnetize one of said inserts each time a defective portion of said material is detected and an impulse is received from said impulse generating device, means connected to said second set of pole pieces constructed and arranged to be actuated by the magnetized inserts as they pass said second set of pole pieces, a demagnetizer positioned between the first set and second set of pole pieces for demagnetizing the inserts after they leave the second set of pole pieces and before they come into the range of the first set of pole pieces, and means for mounting said pole pieces for movement along the path of travel of said inserts to permit the instant of magnetization and detection to be changed.

9. A memory device comprising, an endless traveling member made of non-magnetic material, one or more rows of magnetizable members mounted on said traveling member at predetermined intervals, a set of stationary magnetizing pole pieces mounted adjacent the paths of travel of said magnetizable members, a second set of stationary pole pieces spaced from said first mentioned set of pole pieces and mounted adjacent each row of magnetizable members, a drive for moving said traveling member with said magnetizable members past said pole pieces at a speed correlated with the speed of travel of a continuous flow of material, means for detecting flaws in said continued flow of material, an impulse generating device, means selectively responsive to impulses from said generating device, for causing said first mentioned set of pole pieces to individually magnetize one or more of said magnetizable members each time the detecting means indicate a flaw and an impulse is received from said impulse generating device, means for diverting a predetermined portion of said material containing said flaw whenever a magnetized member passes one of said second mentioned sets of pole pieces and a demagnetizer mounted adjacent the path of travel of all rows of magnetizable members to demagnetize said members after they have passed one of said second mentioned sets of pole pieces and before they return to said first mentioned set of pole pieces.

10. A memory device comprising an endless traveling member, spaced individually magnetizable members mounted on said endless traveling member at predetermined intrevals, pole pieces mounted at predetermined positions past which said magnetizable members move, a second set of pole pieces mounted at predetermined positions past which said magnetizable members move and spaced from said first set of pole pieces, a drive for moving said traveling member at a rate of speed which is correlated with the speed of travel of the material which is to be detected, an impulse generator, means selectively responsive to impulses from said generating device for causing said first named pole pieces to individually magnetize one of said magnetizable members each time a defective portion of said material is detected and an impulse is received from said impulse generating device, an electrical device connected to said second set of pole pieces which is constructed and arranged to be actuated by the movement of the magnetizable members as they pass by said second set of pole pieces, and a demagnetizer positioned between the first and second set of pole pieces for demagnetizing the magnetizable members after they move past the second set of pole pieces and before they come into the range of the first set of pole pieces.

11. A device for controlling the operation of a defective cigarette ejector comprising, a wheel made of non-magnetic material, magnetizable inserts mounted at predetermined intervals in said wheel, a drive for rotating said wheel in time with the movement of a cigarette rod through a cigarette making machine, a toothed member driven in time with the movement of said wheel wherein the movement of the teeth on said member past a given point is timed to correspond to the rate at which the machine manufactures cigarettes, a flat spring adapted to spring from tooth to tooth as the toothed member rotates, a coil having a magnetic core for setting up a magnetic field in the area where said spring snaps to create sharp pulses of current each time said spring snaps from tooth to tooth, means connecting said coil to an electric circuit, pole pieces positioned adjacent to the path of travel of said magnetic inserts for magnetizing one of said inserts located between the pole pieces each time the pole pieces are magnetized, connections between said pole pieces and said circuit, a detector for detecting defective portions in a cigarette rod and transmitting a signal of said detection to said circuit, and means in said circuit for magnetizing said pole pieces to magnetize one of said inserts each time a signal of a predetermined intensity from said detector is transmitted to said circuit simultaneously with an impulse of current from said magnetic coil.

12. Apparatus for feeding material to be processed continuously along a predetermined path of travel, a separator for diverting said material upon completion into a plurality of collecting areas, spaced electrodes adjoining the path of travel of said material, a generator for providing a high frequency voltage to said electrodes, an electrical measuring bridge for measuring the characteristics of the material being manufactured, said electrodes forming one arm of said electrical measuring bridge, a circuit for converting, amplifying and rectifying the output of said bridge, a circuit for feeding said amplified output to other equipment for controlling, regulating and rejecting material having undesirable characteristics, a member, made of non-magnetic material, moving in a continuous path in timed relationship with the travel of said material along said predetermined path of travel, magnetizable inserts mounted in said non-magnetic member and spaced from each other a distance corresponding to the length in which said material is severed, pole pieces for magnetizing said inserts each time material deviates from the characteristics desired, a device adapted to be actuated by said inserts when the material reaches a predetermined area, and apparatus actuated through said device for rejecting the severed material having undesirable characteristics.

13. In a continuous rod cigarette making machine including a continuous paper tape, a feed for showering tobacco on to said tape as it is moved along a predetermined path of travel, a device for forming said paper tape into a continuous cigarette rod, a cutter for severing said rod into lengths of cigarette size, a plurality of collector belts for receiving cigarettes cut into cigarette lengths, a cigarette rejector for each belt for removing sub-normal cigarettes, a device for detecting the condition of a cigarette rod being manufactured comprising spaced electrodes positioned adjacent to the path of travel of said cigarette rod, a circuit for impressing across said electrodes an alternating voltage of at least 50 megacycles so that the impedance of the condenser formed by the electrodes with that section of the rod which is located adjacent thereto is substantially independent of the geometric distribution and position of the tobacco strands contained in said section, a traveling member moving in timed relation with the movement of said cigarette rod through said cigarette making machine, magnetizable spaced members arranged in a plurality of spaced rows on said traveling member, apparatus for measuring said impedance or any component thereof, means responsive to said measurements to cause one of said magnetizable members to be magnetized each time said measurement exceeds predetermined limits, and a control operated by said magnetized members to operate one of said rejectors each time said measurement exceeds predetermined limits to remove the subnormal cigarette from one of said collector belts.

14. In a cigarette making machine, a memory device for operating a defective cigarette rejector, said memory device comprising, a non-magnetic endless traveling member, magnetizable members mounted on said traveling member at predetermined equally spaced intervals, a cigarette rod former, a drive for moving a cigarette rod through said cigarette making machine at a predetermined rate of speed, means for moving said endless traveling member at a speed correlated with the movement of said cigarette rod, a detector for detecting defects in the cigarette rod, a set of stationary magnetizing pole pieces mounted adjacent the path of travel of said magnetizable members, said magnetizing pole pieces being of a length that corresponds with the distance said traveling member moves for one cigarette length of travel of the cigarette rod, a second set of stationary pick up pole pieces mounted adjacent the path of travel of said magnetizable members and spaced from said first mentioned set of pole pieces a distance corresponding to the time it takes a portion of the cigarette rod to travel from the detector to the rejecting station, which distance is equal to the length of time it takes a magnetizable member on said traveling member to travel from the first set of magnetizing pole pieces to the second set of pick up pole pieces, a circuit causing said first mentioned set of pole pieces to magnetize a magnetizable member located within the field of said first set of pole pieces each time the detector detects a defect in the cigarette rod, a defective cigarette rejector for removing defective cigarettes, a second circuit actuating said rejector to remove a defective cigarette each time a magnetized member passes by said pick-up pole pieces, and a demagnetizer mounted adjacent the path of travel of said magnetizable members to demagnetize said members after they have passed said second set of pole pieces and before they return within the range of said first mentioned set of pole pieces.

15. In a cigarette making machine including a feed for feeding tobacco continuously, a rod former for enclosing said fed tobacco in a paper tape to form a cigarette rod, a device for applying paste to one edge of said paper tape, a sealer for folding the pasted edge about the cigarette filler to form a cigarette rod, a device for detecting the condition of a cigarette rod as it is being manufactured comprising, a pair of spaced electrodes positioned on opposite sides of said rod, a mounting for said electrodes for orienting said electrodes with respect to said rods so that the pasted seam travels directly in front of one of the electrodes, means for impressing on the aforesaid electrodes an alternating voltage of between 50 and 200 megacycles so that the impedance of a condenser formed by the electrodes and the portion of said cigarette rod passing between said electrodes is substantially independent of the geometric distribution of the tobacco in said cigarette rod, an electrical impedance measuring bridge connected to said electrodes so that said condenser formed by the electrodes in the portions of said rod passing between the electrodes comprises at least one arm of said bridge, a circuit for amplifying the measurements made by said bridge to obtain a signal and a control operated by said signal each time it reaches a predetermined intensity.

16. In a continuous rod cigarette making machine including a continuous paper tape, a feed for showering tobacco onto said tape, a paster for applying paste to one edge of said paper tape, a folder for overlapping the pasted seam of said tape to form a cigarette rod, a device for detecting the condition of a cigarette rod as it is being manufactured comprising spaced electrodes positioned adjacent the path of travel of said pasted cigarette rod, a groove formed in one of the electrodes straddling the pasted seam to avoid the accumulation of paste, a circuit for impressing across the electrodes an alternating voltage of not less than 50 megacycles so that the impedance of a condenser formed by the electrodes and the portion of said cigarette rod passing between said electrodes is substantially independent of the geometric distribution of the tobacco in said cigarette rod, an electrical impedance measuring bridge connected to said electrodes so that said condenser formed by the electrodes in the portions of said rod passing between the electrodes comprises at least one arm of said bridge, an amplifier for amplifying said measurements to obtain a signal, and a control operated by said signal after it reaches a predetermined intensity.

17. In a continuous rod cigarette making machine including a paper tape, a feed for showering tobacco onto said tape as it is moved along a predetermined path of travel, a paster for applying paste to one edge of said paper tape, a folder for overlapping the pasted seam of said tape to form a cigarette rod, a device for detecting the condition of a cigarette rod as it is being manufactured comprising electrodes positioned on opposite sides of said rod to cause a dielectric field to pass perpendicularly through the thinnest portion of said tape, an alternating voltage of not less than 50 megacycles impressed across said electrodes so that the impedance of a condenser formed by the electrodes and the portion of said cigarette rod passing between said electrodes is substantially independent of the geometric distribution of the tobacco in said cigarette rod, an electrical impedance measuring bridge connected to said electrodes so that said condenser formed by the electrodes in the portions of said rod passing between the electrodes comprises at least one arm of said bridge, an amplifier for amplifying said measurements to obtain a signal, and a control operated by said signal after it reaches a predetermined intensity.

18. In a continuous rod cigarette making machine including a continuous paper tape, a feed for showering tobacco on said tape as it is moved along a predetermined path of travel, a device for forming said paper tape and tobacco into a continuous cigarette rod, a device for detecting the condition of a cigarette rod as it is being manufactured comprising spaced electrodes positioned adjacent to the path of travel of said cigarette rod, a circuit for impressing across said electrodes and alternating voltage of at least 50 megacycles so that the impedance of the condenser formed by the electrodes with that section of the rod which is located adjacent thereto is substantially independent of the geometric distribution and position of the tobacco strands contained in said section, apparatus for measuring said impedance or any component thereof and means connected to said measuring apparatus for operating a speed control which controls the quantity of tobacco being showered on said tape.

19. In a continuous rod cigarette making machine including a continuously traveling paper tape, a feed for showering tobacco on to said tape as it is moved along a predetermined path of travel, a device for forming said paper tape and tobacco into a continuous cigarette rod, a cigarette rejector for removing subnormal cigarettes, a device for detecting the condition of a cigarette rod being manufactured comprising spaced electrodes positioned adjacent to the path of travel of said cigarette rod, a circuit for impressing across said electrodes an alternating voltage of at least 50 megacycles so that the impedance of the condenser formed by the electrodes with that section of the rod which is located adjacent thereto is substantially independent of the geometric distribution and position of the tobacco strands contained in said section, and apparatus for measuring said impedance or any component thereof, and means responsive to said measurements for actuating said cigarette rejector each time said measurement exceeds predetermined limits.

20. In a cigarette making machine, a rod former, a cutter for severing said rod into cigarette lengths, a detector mounted in advance of said cutter for detecting defects in those portions of the rod where the cutter will sever the rod, and a rejector for only removing cigarettes having defects at or near the points of severance.

21. In a cigarette making machine, apparatus for making cigarettes having tobacco fillers of substantially uniform density comprising a pair of spaced electrodes positioned on opposite sides of the path along which a continuous length of cigarette rod travels, a source of alternating voltage having a frequency of more than 50 megacycles, means for impressing said voltage across said electrodes so that the impedance of the condenser formed by the electrodes and each successive increment of said rod moving between said electrodes is substantially independent of the geometric distribution of the strands of tobacco filler in said increment of said rod, means for cutting and forming the rod into cigarettes, means for identifying for separation and segregation the cigarettes containing said increments having a density varying from a predetermined value as represented by changes in said voltage, and means responsive to said changes in said voltage for segregating said identified cigarettes from the remaining portion of said cigarettes made from said rod, whereby each of said remaining cigarettes contains a substantially uniform density of tobacco filler.

22. A circuit for rejecting portions of shredded heterogeneous material being manufactured into a product, said material having density characteristics which deviate from a predetermined norm comprising a measuring circuit for measuring deviations in the density of the material as it travels in a continuous stream, said measuring circuit including a very high frequency bridge circuit, an oscillator having an output voltage with a frequency of at least 50 megacycles connected to said bridge circuit for energizing said measuring circuit, said bridge circuit having an output voltage whose amplitude is representative of deviations in the density of said material from a predetermined norm, a second oscillator having an output voltage appreciably less than said first-named oscillator, a mixing circuit connected to said bridge circuit and said second oscillator for beating the output voltage of said bridge circuit with the output voltage of said second oscillator to produce an output signal from said mixer having a frequency equal to the difference between the frequency of said first-named oscillator and said second-named oscillator, a circuit connected to said mixer circuit for amplifying amplitude changes of said output signal, means connected to said amplifier for rectifying said amplitude changes, and means responsive to changes in amplitude in said rectified signal for actuating a rejector for rejecting said heterogeneous material when said material deviates from a predetermined value of density.

References Cited in the file of this patent

UNITED STATES PATENTS

| 2,041,114 | Carini | May 19, 1936 |
| 2,094,351 | Draper | Sept. 28, 1937 |
| 2,157,694 | Fisher | May 9, 1939 |
| 2,297,346 | Crist | Sept. 29, 1942 |
| 2,340,914 | Whitaker | Feb. 8, 1944 |
| 2,357,801 | Arelt | Sept. 12, 1944 |
| 2,357,860 | Whitaker | Sept. 12, 1944 |
| 2,363,336 | Keeler | Nov. 21, 1944 |
| 2,422,742 | Odessey | June 24, 1947 |
| 2,437,168 | Marihart | Mar. 2, 1948 |
| 2,439,446 | Begun | Apr. 13, 1948 |
| 2,475,245 | Leaver | July 5, 1949 |
| 2,519,089 | Whitaker | Aug. 15, 1950 |
| 2,535,027 | Anderson | Dec. 26, 1950 |
| 2,535,930 | Jones | Dec. 26, 1950 |
| 2,566,767 | Hunt | Sept. 4, 1951 |
| 2,587,686 | Berry | Mar. 4, 1952 |

FOREIGN PATENTS

| 275,741 | Great Britain | Aug. 18, 1927 |
| 507,231 | Great Britain | 1939 |
| 587,210 | Great Britain | Apr. 17, 1947 |

OTHER REFERENCES

"Handbook of Industrial Electronic Circuits," by J. Markus and V. Zeluff. Published 1948 by McGraw-Hill Book Co., N. Y.

Alexander: Pages 116–119 of the April 1945 issue of "Electronics."

Electronics Dictionary, by N. M. Cooke and John Markus. Published 1945 by McGraw-Hill Book Co., New York. Page 164.

RCA—"Practical Analysis of Ultra High Frequency," by J. R. Meagher and H. J. Markley. Published 1943 by RCA Service Co. Inc., Camden, N. J. Page 7.

"Industrial Electronics and Control," by R. G. Kloeffler. Page 198. Published 1949 by John Wiley and Sons, Inc., New York.